United States Patent
Kaya et al.

(10) Patent No.: US 12,267,186 B2
(45) Date of Patent: Apr. 1, 2025

(54) PREAMBLE MATRIX

(71) Applicant: Nokia Solutions and Networks Oy, Espoo (FI)

(72) Inventors: Aliye Kaya, Murray Hill, NJ (US); Luiz Fernando Medeiros, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/471,589

(22) Filed: Sep. 21, 2023

(65) Prior Publication Data
US 2024/0106682 A1   Mar. 28, 2024

(30) Foreign Application Priority Data
Sep. 22, 2022  (FI) ................................ 20225823

(51) Int. Cl.
*H04L 25/02* (2006.01)
*H04L 5/00* (2006.01)

(52) U.S. Cl.
CPC ........ *H04L 25/0204* (2013.01); *H04L 5/0048* (2013.01); *H04L 25/0224* (2013.01)

(58) Field of Classification Search
CPC .......... H04L 5/0048; H04L 25/0204; H04L 25/0224
See application file for complete search history.

(56) References Cited

U.S. PATENT DOCUMENTS

| | | | |
|---|---|---|---|
| 2005/0249319 A1* | 11/2005 | Suh | H04L 25/0228 375/347 |
| 2008/0235314 A1* | 9/2008 | Lee | H04L 5/023 708/426 |
| 2012/0294185 A1 | 11/2012 | Queseth et al. | |
| 2018/0070381 A1* | 3/2018 | Lei | H04L 1/004 |
| 2020/0229244 A1 | 7/2020 | Yan et al. | |
| 2020/0396774 A1 | 12/2020 | Thota et al. | |
| 2022/0046713 A1 | 2/2022 | Park et al. | |
| 2022/0094413 A1 | 3/2022 | Park et al. | |
| 2022/0104230 A1 | 3/2022 | Yoshimura et al. | |
| 2024/0008098 A1* | 1/2024 | Fan | H04W 72/1268 |

FOREIGN PATENT DOCUMENTS

| | | |
|---|---|---|
| CN | 101873712 B | 3/2013 |
| CN | 111447160 A | 7/2020 |
| CN | 111629445 A | 9/2020 |
| CN | 113348721 A | 9/2021 |
| CN | 113972939 A | 1/2022 |

(Continued)

OTHER PUBLICATIONS

Pitaval et al., "Overcoming 5G PRACH Capacity Shortfall by Combining Zadoff-Chu and M-Sequences", IEEE International Conference on Communications (ICC), May 20-24, 2018, 6 pages.

(Continued)

*Primary Examiner* — David B Lugo
(74) *Attorney, Agent, or Firm* — Nokia Technologies Oy

(57) ABSTRACT

Disclosed is a method comprising generating a preamble matrix comprising a plurality of entries, wherein at least a subset of the plurality of entries indicate random-access preambles; obtaining a sequence encoded with the preamble matrix; and transmitting the sequence to one or more user devices.

13 Claims, 10 Drawing Sheets

(56) References Cited

FOREIGN PATENT DOCUMENTS

| CN | 114467358 A | 5/2022 |
|---|---|---|
| WO | 2018/201966 A1 | 11/2018 |
| WO | 2020/173282 A1 | 9/2020 |

OTHER PUBLICATIONS

Vural et al., "Dynamic Preamble Subset Allocation for RAN Slicing in 5G Networks", IEEE Access, vol. 6, Jan. 31, 2018, pp. 13015-13032.

Hwang et al., "Dynamic RACH Preamble Allocation Scheme", International Conference on Information and Communication Technology Convergence (ICTC), Oct. 28-30, 2015, pp. 770-772.

Gedikli, "Artificial Intelligence Based Flexible Preamble Allocation for Radio Access Network Slicing in 5G Networks", Thesis, Graduate School of Science and Engineering of Hacettepe University, Jun. 2021, 126 pages.

Office Action received for corresponding Finnish Patent Application No. 20225823, dated Feb. 16, 2023, 15 pages.

Mostafa et al., "Aggregate Preamble Sequence Design and Detection for Massive IoT With Deep Learning", IEEE Transactions on Vehicular Technology, vol. 70, No. 4, Apr. 2021, pp. 3800-3816.

Office Action received for corresponding Finnish Patent Application No. 20225823, dated Aug. 15, 2023, 12 pages.

Extended European Search Report for corresponding EP Application No. 23198455.0, dated Feb. 26, 2024.

Panasonic, et al., "RACH sequence allocation and indication to the cell", 3GPP TSG RAN WG1 Meeting #49bis, Orlando, FL, USA, Jun. 25-29, 2007, R1-072800, 9 pages.

Texas Instruments, "Random Access Preamble L1 Parameters in E-UTRA", 3GPP TSG RAN WG1 #49bis, Orlando, FL, USA, Jun. 25-29, 2007, R1-072838, 5 pages.

Office action received for corresponding Chinese Patent Application No. 202311226683.8, dated Nov. 20, 2024, 9 pages of office action and 4 pages of translation/summary available.

* cited by examiner

PREAMBLE MATRIX

FIELD

The following example embodiments relate to wireless communication.

BACKGROUND

As resources are limited, it is desirable to improve the usage of network resources.

BRIEF DESCRIPTION

The scope of protection sought for various example embodiments is set out by the independent claims. The example embodiments and features, if any, described in this specification that do not fall under the scope of the independent claims are to be interpreted as examples useful for understanding various embodiments.

According to an aspect, there is provided an apparatus comprising at least one processor, and at least one memory storing instructions which, when executed by the at least one processor, cause the apparatus at least to: generate a preamble matrix comprising a plurality of entries, wherein at least a subset of the plurality of entries indicate random-access preambles; obtain a sequence encoded with the preamble matrix; and transmit the sequence to one or more user devices.

According to another aspect, there is provided an apparatus comprising: means for generating a preamble matrix comprising a plurality of entries, wherein at least a subset of the plurality of entries indicate random-access preambles; means for obtaining a sequence encoded with the preamble matrix; and means for transmitting the sequence to one or more user devices.

According to another aspect, there is provided a method comprising: generating a preamble matrix comprising a plurality of entries, wherein at least a subset of the plurality of entries indicate random-access preambles; obtaining a sequence encoded with the preamble matrix; and transmitting the sequence to one or more user devices.

According to another aspect, there is provided a computer program comprising instructions which, when executed by an apparatus, cause the apparatus to perform at least the following: generating a preamble matrix comprising a plurality of entries, wherein at least a subset of the plurality of entries indicate random-access preambles; obtaining a sequence encoded with the preamble matrix; and transmitting the sequence to one or more user devices.

According to another aspect, there is provided a computer readable medium comprising program instructions which, when executed by an apparatus, cause the apparatus to perform at least the following: generating a preamble matrix comprising a plurality of entries, wherein at least a subset of the plurality of entries indicate random-access preambles; obtaining a sequence encoded with the preamble matrix; and transmitting the sequence to one or more user devices.

According to another aspect, there is provided a non-transitory computer readable medium comprising program instructions which, when executed by an apparatus, cause the apparatus to perform at least the following: generating a preamble matrix comprising a plurality of entries, wherein at least a subset of the plurality of entries indicate random-access preambles; obtaining a sequence encoded with the preamble matrix; and transmitting the sequence to one or more user devices.

According to another aspect, there is provided an apparatus comprising at least one processor, and at least one memory storing instructions which, when executed by the at least one processor, cause the apparatus at least to: receive a sequence from a network element of a radio access network, wherein the sequence is encoded with a preamble matrix comprising a plurality of entries, wherein at least a subset of the plurality of entries indicate random-access preambles; decode the sequence; generate a root sequence and a cyclic shift based at least partly on the decoding; generate a random-access preamble based on the root sequence and the cyclic shift; and transmit the random-access preamble to the network element.

According to another aspect, there is provided an apparatus comprising: means for receiving a sequence from a network element of a radio access network, wherein the sequence is encoded with a preamble matrix comprising a plurality of entries, wherein at least a subset of the plurality of entries indicate random-access preambles; means for decoding the sequence; means for generating a root sequence and a cyclic shift based at least partly on the decoding; means for generating a random-access preamble based on the root sequence and the cyclic shift; and means for transmitting the random-access preamble to the network element.

According to another aspect, there is provided a method comprising: receiving a sequence from a network element of a radio access network, wherein the sequence is encoded with a preamble matrix comprising a plurality of entries, wherein at least a subset of the plurality of entries indicate random-access preambles; decoding the sequence; generating a root sequence and a cyclic shift based at least partly on the decoding; generating a random-access preamble based on the root sequence and the cyclic shift; and transmitting the random-access preamble to the network element.

According to another aspect, there is provided a computer program comprising instructions which, when executed by an apparatus, cause the apparatus to perform at least the following: receiving a sequence from a network element of a radio access network, wherein the sequence is encoded with a preamble matrix comprising a plurality of entries, wherein at least a subset of the plurality of entries indicate random-access preambles; decoding the sequence; generating a root sequence and a cyclic shift based at least partly on the decoding; generating a random-access preamble based on the root sequence and the cyclic shift; and transmitting the random-access preamble to the network element.

According to another aspect, there is provided a computer readable medium comprising program instructions which, when executed by an apparatus, cause the apparatus to perform at least the following: receiving a sequence from a network element of a radio access network, wherein the sequence is encoded with a preamble matrix comprising a plurality of entries, wherein at least a subset of the plurality of entries indicate random-access preambles; decoding the sequence; generating a root sequence and a cyclic shift based at least partly on the decoding; generating a random-access preamble based on the root sequence and the cyclic shift; and transmitting the random-access preamble to the network element.

According to another aspect, there is provided a non-transitory computer readable medium comprising program instructions which, when executed by an apparatus, cause the apparatus to perform at least the following: receiving a sequence from a network element of a radio access network, wherein the sequence is encoded with a preamble matrix comprising a plurality of entries, wherein at least a subset of the plurality of entries indicate random-access preambles; decoding the sequence; generating a root sequence and a cyclic shift based at least partly on the decoding; generating a random-access preamble based on the root sequence and the cyclic shift; and transmitting the random-access preamble to the network element.

According to another aspect, there is provided an apparatus comprising at least one processor, and at least one memory storing instructions which, when executed by the at least one processor, cause the apparatus at least to: create a first matrix comprising a plurality of random-access preamble sets; select a sample batch from the first matrix; input the sample batch to an encoder with at least one neural network layer; receive a sequence as an output from the encoder, wherein the sequence is encoded with the sample batch; input the sequence to a decoder with at least one neural network layer; receive a second matrix as an output from the decoder; determine a binary cross-entropy loss comparing the sample batch and the second matrix; propagate the binary cross-entropy loss to the decoder and the encoder via an optimizer; and repeat the selection of the sample batch, the inputting of the sample batch, the receiving of the sequence, the inputting of the sequence, the receiving of the second matrix, the determining, and the propagating until the binary cross-entropy loss is below a threshold.

According to another aspect, there is provided an apparatus comprising: means for creating a first matrix comprising a plurality of random-access preamble sets; means for selecting a sample batch from the first matrix; means for inputting the sample batch to an encoder with at least one neural network layer; means for receiving a sequence as an output from the encoder, wherein the sequence is encoded with the sample batch; means for inputting the sequence to a decoder with at least one neural network layer; means for receiving a second matrix as an output from the decoder; means for determining a binary cross-entropy loss comparing the sample batch and the second matrix; means for propagating the binary cross-entropy loss to the decoder and the encoder via an optimizer; and means for repeating the selection of the sample batch, the inputting of the sample batch, the receiving of the sequence, the inputting of the sequence, the receiving of the second matrix, the determining, and the propagating until the binary cross-entropy loss is below a threshold.

According to another aspect, there is provided a method comprising: creating a first matrix comprising a plurality of random-access preamble sets; selecting a sample batch from the first matrix; inputting the sample batch to an encoder with at least one neural network layer; receiving a sequence as an output from the encoder, wherein the sequence is encoded with the sample batch; inputting the sequence to a decoder with at least one neural network layer; receiving a second matrix as an output from the decoder; determining a binary cross-entropy loss comparing the sample batch and the second matrix; propagating the binary cross-entropy loss to the decoder and the encoder via an optimizer; and repeating the selection of the sample batch, the inputting of the sample batch, the receiving of the sequence, the inputting of the sequence, the receiving of the second matrix, the determining, and the propagating until the binary cross-entropy loss is below a threshold.

According to another aspect, there is provided a computer program comprising instructions which, when executed by an apparatus, cause the apparatus to perform at least the following: creating a first matrix comprising a plurality of random-access preamble sets; selecting a sample batch from the first matrix; inputting the sample batch to an encoder with at least one neural network layer; receiving a sequence as an output from the encoder, wherein the sequence is encoded with the sample batch; inputting the sequence to a decoder with at least one neural network layer; receiving a second matrix as an output from the decoder; determining a binary cross-entropy loss comparing the sample batch and the second matrix; propagating the binary cross-entropy loss to the decoder and the encoder via an optimizer; and repeating the selection of the sample batch, the inputting of the sample batch, the receiving of the sequence, the inputting of the sequence, the receiving of the second matrix, the determining, and the propagating until the binary cross-entropy loss is below a threshold.

According to another aspect, there is provided a computer readable medium comprising program instructions which, when executed by an apparatus, cause the apparatus to perform at least the following: creating a first matrix comprising a plurality of random-access preamble sets; selecting a sample batch from the first matrix; inputting the sample batch to an encoder with at least one neural network layer; receiving a sequence as an output from the encoder, wherein the sequence is encoded with the sample batch; inputting the sequence to a decoder with at least one neural network layer; receiving a second matrix as an output from the decoder; determining a binary cross-entropy loss comparing the sample batch and the second matrix; propagating the binary cross-entropy loss to the decoder and the encoder via an optimizer; and repeating the selection of the sample batch, the inputting of the sample batch, the receiving of the sequence, the inputting of the sequence, the receiving of the second matrix, the determining, and the propagating until the binary cross-entropy loss is below a threshold.

According to another aspect, there is provided a non-transitory computer readable medium comprising program instructions which, when executed by an apparatus, cause the apparatus to perform at least the following: creating a first matrix comprising a plurality of random-access preamble sets; selecting a sample batch from the first matrix; inputting the sample batch to an encoder with at least one neural network layer; receiving a sequence as an output from the encoder, wherein the sequence is encoded with the sample batch; inputting the sequence to a decoder with at least one neural network layer; receiving a second matrix as an output from the decoder; determining a binary cross-entropy loss comparing the sample batch and the second matrix; propagating the binary cross-entropy loss to the decoder and the encoder via an optimizer; and repeating the selection of the sample batch, the inputting of the sample batch, the receiving of the sequence, the inputting of the sequence, the receiving of the second matrix, the determining, and the propagating until the binary cross-entropy loss is below a threshold.

According to another aspect, there is provided a system comprising at least one or more user devices and a network element of a radio access network. The network element is configured to: generate a preamble matrix comprising a plurality of entries, wherein at least a subset of the plurality of entries indicate random-access preambles; obtain a sequence encoded with the preamble matrix; and transmit the sequence to the one or more user devices. The one or more user devices are configured to: receive the sequence from the network element; decode the sequence; generate a root sequence and a cyclic shift based at least partly on the decoding; generate a random-access preamble based on the root sequence and the cyclic shift; and transmit the random-access preamble to the network element.

According to another aspect, there is provided a system comprising at least one or more user devices and a network element of a radio access network. The network element comprises: means for generating a preamble matrix comprising a plurality of entries, wherein at least a subset of the plurality of entries indicate random-access preambles; means for obtaining a sequence encoded with the preamble matrix; and means for transmitting the sequence to the one or more user devices. The one or more user devices comprise: means for receiving the sequence from the network element; means for decoding the sequence; means for generating a root sequence and a cyclic shift based at least partly on the decoding; means for generating a random-access preamble based on the root sequence and the cyclic shift; and means for transmitting the random-access preamble to the network element.

LIST OF DRAWINGS

In the following, various example embodiments will be described in greater detail with reference to the accompanying drawings, in which FIG. 1 illustrates an example of a cellular communication network;

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different example embodiments will be described using, as an example of an access architecture to which the example embodiments may be applied, a radio access architecture based on long term evolution advanced (LTE Advanced, LTE-A), new radio (NR, 5G), beyond 5G, or sixth generation (6G) without restricting the example embodiments to such an architecture, however. It is obvious for a person skilled in the art that the example embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, substantially the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
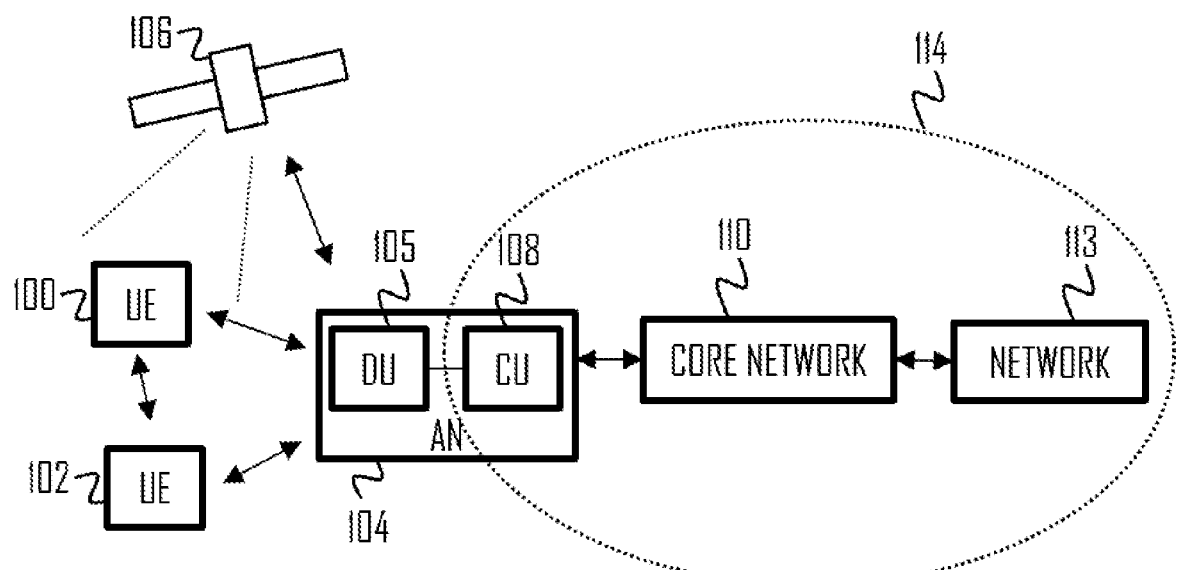

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The example embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a radio cell with an access node (AN) 104, such as an evolved Node B (abbreviated as eNB or eNodeB) or a next generation Node B (abbreviated as gNB or gNodeB), providing the radio cell. The physical link from a user device to an access node may be called uplink (UL) or reverse link, and the physical link from the access node to the user device may be called downlink (DL) or forward link. A user device may also communicate directly with another user device via sidelink (SL) communication. It should be appreciated that access nodes or their functionalities may be implemented by using any node, host, server or access point etc. entity suitable for such a usage.

A communication system may comprise more than one access node, in which case the access nodes may also be configured to communicate with one another over links, wired or wireless, designed for the purpose. These links may be used for signaling purposes and also for routing data from one access node to another. The access node may be a computing device configured to control the radio resources of communication system it is coupled to. The access node may also be referred to as a base station, a base transceiver station (BTS), an access point or any other type of interfacing device including a relay station capable of operating in a wireless environment. The access node may include or be coupled to transceivers. From the transceivers of the access node, a connection may be provided to an antenna unit that establishes bi-directional radio links to user devices. The antenna unit may comprise a plurality of antennas or antenna elements. The access node may further be connected to a core network 110 (CN or next generation core NGC). Depending on the deployed technology, the counterpart that the access node may be connected to on the CN side may be a serving gateway (S-GW, routing and forwarding user data packets), packet data network gateway (P-GW) for providing connectivity of user devices to external packet data networks, user plane function (UPF), mobility management entity (MME), or an access and mobility management function (AMF), etc.

The user device illustrates one type of an apparatus to which resources on the air interface may be allocated and assigned, and thus any feature described herein with a user device may be implemented with a corresponding apparatus, such as a relay node.

An example of such a relay node may be a layer 3 relay (self-backhauling relay) towards the access node. The self-backhauling relay node may also be called an integrated access and backhaul (IAB) node. The IAB node may comprise two logical parts: a mobile termination (MT) part, which takes care of the backhaul link(s) (i.e., link(s) between IAB node and a donor node, also known as a parent node) and a distributed unit (DU) part, which takes care of the access link(s), i.e., child link(s) between the IAB node and user device(s), and/or between the IAB node and other IAB nodes (multi-hop scenario).

Another example of such a relay node may be a layer 1 relay called a repeater. The repeater may amplify a signal received from an access node and forward it to a user device, and/or amplify a signal received from the user device and forward it to the access node.

The user device may also be called a subscriber unit, mobile station, remote terminal, access terminal, user terminal, terminal device, or user equipment (UE) just to mention but a few names or apparatuses. The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, multimedia device, reduced capability (RedCap) device, wireless sensor device, or any device integrated in a vehicle.

It should be appreciated that a user device may also be a nearly exclusive uplink-only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable or wearable device with radio parts (such as a watch, earphones or eyeglasses) and the computation may be carried out in the cloud or in another user device. The user device (or in some example embodiments a layer 3 relay node) may be configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may have multiple radio interfaces, namely below 6 GHz, cmWave and mmWave, and also being integrable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave-mmWave). One of the concepts considered to be used in 5G networks may be network slicing, in which multiple independent and dedicated virtual sub-networks (network instances) may be created within the substantially same infrastructure to run services that have different requirements on latency, reliability, throughput and mobility.

The current architecture in LTE networks may be fully distributed in the radio and fully centralized in the core network. The low latency applications and services in 5G may need to bring the content close to the radio which leads to local break out and multi-access edge computing (MEC). 5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical 30 control, healthcare applications).

The communication system may also be able to communicate with one or more other networks 113, such as a public switched telephone network or the Internet, or utilize services provided by them. The communication network may also be able to support the usage of cloud services, for example at least part of core network operations may be carried out as one or more cloud services (this is depicted in FIG. 1 by "cloud" 114). There may also be multiple clouds, and the clouds may be physically spread in virtual and physical forms. The communication system may also comprise a central control entity, or the like, providing facilities for networks of different operators to cooperate for example in spectrum sharing.

An access node may also be split into: a radio unit (RU) comprising a radio transceiver (TRX), i.e., a transmitter (Tx) and a receiver (Rx); one or more distributed units (DUs) 105 that may be used for the so-called Layer 1 (L1) processing and real-time Layer 2 (L2) processing; and a central unit (CU) 108 (also known as a centralized unit) that may be used for non-real-time L2 and Layer 3 (L3) processing. The CU may be connected to the one or more DUs for example via an F1 interface. Such a split may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU 108 may be defined as a logical node hosting higher layer protocols, such as radio resource control (RRC), service data adaptation protocol (SDAP) and/or packet data convergence protocol (PDCP), of the access node. The DU 105 may be defined as a logical node hosting radio link control (RLC), medium access control (MAC) and/or physical (PHY) layers of the access node. The operation of the DU may be at least partly controlled by the CU. The CU may comprise a control plane (CU-CP), which may be defined as a logical node hosting the RRC and the control plane part of the PDCP protocol of the CU for the access node. The CU may further comprise a user plane (CU-UP), which may be defined as a logical node hosting the user plane part of the PDCP protocol and the SDAP protocol of the CU for the access node.

Cloud computing platforms may also be used to run the CU and/or DU. The CU may run in a cloud computing platform, which may be referred to as a virtualized CU (vCU). In addition to the vCU, there may also be a virtualized DU (vDU) running in a cloud computing platform. Furthermore, there may also be a combination, where the DU may use so-called bare metal solutions, for example application-specific integrated circuit (ASIC) or customer-specific standard product (CSSP) system-on-a-chip (SoC) solutions. It should also be understood that the distribution of functions between the above-mentioned access node units, or different core network operations and access node operations, may differ.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head (RRH) or a radio unit (RU), or an access node comprising radio parts. It is also possible that node operations may be distributed among a plurality of servers, nodes or hosts. Application of cloudRAN architecture enables RAN real-time functions being carried out at the RAN side (in a distributed unit, DU 105) and non-real time functions being carried out in a centralized manner (in a centralized unit, CU 108).

It should also be understood that the distribution of functions between core network operations and access node operations may differ from that of the LTE or even be non-existent. Some other technology advancements that may be used include big data and all-IP, which may change the way networks are being constructed and managed. 5G (or new radio, NR) networks may be designed to support multiple hierarchies, where MEC servers may be placed between the core and the access node. It should be appreciated that MEC may be applied in 4G networks as well.

5G may also utilize non-terrestrial communication, for example satellite communication, to enhance or complement the coverage of 5G service, for example by providing backhauling. Possible use cases may be providing service continuity for machine-to-machine (M2M) or Internet of Things (IOT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). A given satellite 106 in the mega-constellation may cover several satellite-enabled network entities that create on-ground cells. The on-ground cells may be created through an on-ground relay node or by an access node 104 located on-ground or in a satellite.

It is obvious for a person skilled in the art that the depicted system is only an example of a part of a radio access system and in practice, the system may comprise a plurality of access nodes, the user device may have access to a plurality of radio cells and the system may also comprise other apparatuses, such as physical layer relay nodes or other network elements, etc. At least one of the access nodes may be a Home eNodeB or a Home gNodeB.

Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The access node(s) of FIG. 1 may provide any kind of these cells. A cellular radio system may be implemented as a multilayer network including several kinds of radio cells. In multilayer networks, one access node may provide one kind of a radio cell or radio cells, and thus a plurality of access nodes may be needed to provide such a network structure.

For fulfilling the need for improving the deployment and performance of communication systems, the concept of "plug-and-play" access nodes may be introduced. A network which may be able to use "plug-and-play" access nodes, may include, in addition to Home eNodeBs or Home gNodeBs, a Home Node B gateway, or HNB-GW (not shown in FIG. 1). An HNB-GW, which may be installed within an operator's network, may aggregate traffic from a large number of Home eNodeBs or Home gNodeBs back to a core network.

A user device may perform a random-access procedure to access a network. The random-access procedure may also be called an initial access procedure. The purpose of performing the random-access procedure may be, for example, initial access, handover, scheduling request, or timing synchronization. There are currently two types of random-access procedures: a contention-based random-access procedure (CBRA) and a contention-free random-access procedure (CFRA). CFRA may also be referred to as non-contention based random access. In CFRA, a given user device has a dedicated (i.e., UE-specific) random-access preamble allocated by the gNB, whereas in CBRA the user device selects the preamble randomly from a pool of preambles shared with other user devices in the cell. In CBRA, the contention (or collision) may occur, if two or more user devices attempt the random-access procedure by using the same random-access procedure on the same resource.

5G NR supports two different CBRA procedures: 4-step RACH and 2-step RACH. RACH is an abbreviation for random-access channel. The 4-step RACH procedure is described below.

Prior to the preamble transmission, there may be a preliminary step of sending and receiving a synchronization signal block (SSB), i.e., DL beam sweeping, which may not be formally part of the random-access procedure. As a result of this preliminary step, the user device may select the index of the preferred SSB beam and decode the associated physical broadcast channel (PBCH) for the master information block (MIB), the system information block (SIB), and so on. This index may also be used by the user device to identify a suitable RACH occasion for the preamble transmission, according to the SSB-to-RACH-occasion mapping indicated by SIB1. The system information provided in the SSB may include the needed information to create the same preamble set that the gNB is configured with.

The 4-step RACH procedure may start with a user device transmitting a random-access preamble to a gNB via the physical random-access channel (PRACH) using a specific radio resource called a RACH occasion. The message carrying the random-access preamble may be referred to as message 1 (Msg1). The user device may uniquely identify the set of possible preambles using the information in the system information broadcasted by the gNB. The user device may randomly choose the random-access preamble out of that set.

The gNB decodes the Msg1 received from the user device and extracts its preamble. The gNB replies to the user device with a random-access response (RAR). The message carrying the random-access response may be referred to as message 2 (Msg2). Msg2 may comprise the detected preamble identifier, a timing advance command, a temporary cell radio network temporary identifier (TC-RNTI), and an UL grant for the transmission of message 3 (Msg3) on the physical uplink shared channel (PUSCH). In other words, in Msg2, the gNB schedules the resource for the user device to transmit Msg3 over PUSCH.

The user device responds to Msg2 over the scheduled PUSCH by transmitting the Msg3 to the gNB using the respective timing advance information on its uplink beams. Msg3 may comprise an RRC connection request, and an identifier of the user device.

The gNB responds to Msg3 by transmitting, to the user device, a message 4 (Msg4) comprising RRC setup information and the user device identifier extracted from Msg3. This may complete the random-access procedure.

The 2-step RACH procedure is otherwise similar to the 4-step RACH procedure described above, but Msg1 and Msg3 are combined into a single message (denoted as MsgA) and transmitted by the user device without waiting for feedback (e.g., Msg2) in between. Similarly, the gNB combines Msg2 and Msg4 into a single message (denoted as MsgB).

As described above, in the random-access procedure, the user device may select a random-access preamble from a pre-defined set called the "preamble set", which may include up to 64 preambles, and the user device may then transmit the selected preamble to the gNB. The preamble set may also be referred to as a PRACH preamble set. The gNB may convey the minimum system information to create a specific preamble set through a broadcast message (e.g., via SSB) in its coverage area. The minimum system information may include the needed information to create the same preamble set that the gNB is configured with. A given user device receiving that message can then create the same preamble set that the gNB is configured with. By choosing a random preamble from that set, they reduce the risk of collision, i.e., the risk of two user devices choosing the same preamble. The chosen preamble may serve as a temporary identifier for the user device and it may be used to extract timing advance information.

A preamble set may be uniquely determined by a first logical root sequence to be used in the preamble set and a cyclic shift parameter value called $N_{CS}$. The consecutive root sequences to be used starting with the first root sequence may be uniquely defined in standards. $N_{CS}$ values may also be uniquely defined in standards for various sequence lengths. Once the first root sequence index and the cyclic shift is known, all 64 preambles in the preamble set may be determined uniquely. As an example, for the first root sequence index 0 and $N_{CS}=2$, the physical root sequences 1 and 138 may be used in the preamble set, by cyclic shifting each sequence by 2.

If two adjacent gNBs use preamble sets with overlapping preambles, the uplink transmissions may interfere with each other if user devices transmit them. This may cause ambiguity for a given gNB in determining which user device wants to connect to it. Therefore, it is desirable that the gNBs use as orthogonal preamble sets as possible.

The operators may configure the preamble set of each cell. To avoid non-orthogonal preamble sets, they should carefully choose the preamble set configuration of each cell and allocate the root sequences between them. A need to repeat the fixed allocation scheme arises whenever a new cell is added or cells are reconfigured. There is a limited number of preamble sets available with current restrictions in the standards in order to identify the preamble sets with just two variables. This constraint of rigid preamble sets may cause suboptimal and frequent root sequence allocations, which are not desirable from the operator's perspective.

6G networks are expected to adopt flexible decentralized and/or distributed computing systems and architecture and ubiquitous computing, with local spectrum licensing, spectrum sharing, infrastructure sharing, and intelligent automated management underpinned by mobile edge computing, artificial intelligence, short-packet communication, distributed ledgers and blockchain technologies. Key features of 6G will include intelligent connected management and control functions, programmability, integrated sensing and communication, reduction of energy footprint, trustworthy infrastructure, scalability and affordability. In addition to these, 6G is also targeting new use cases covering the integration of localization and sensing capabilities into system definition to unifying user experience across physical and digital worlds.

As described above, a given preamble set may be uniquely identified by using a logical root sequence identifier and a parameter indicating cyclic shift. This enables conveying the preamble set easily to the user device. However, this may not be the most effective way of creating preamble sets. The sets enabled in the current standards may be suboptimal for the need of the next generation networks (e.g., 6G) due to the expected high number of user devices, subcells, and data rate support expectations. Possible issues caused by rigid preamble sets in such contexts may include PRACH capacity shortfall, interference, and range limitation. These problems emerge from the legacy approach, which introduces a limited number of preamble sets that may be incapable of handling the next generation requirements. One way to resolve the problems noted above is to increase the number of available preamble sets exponentially. Such heterogenous preamble sets would solve problems like PRACH capacity shortfall, interference, and range limitation.

As an example, in order to convey a preamble set, the gNB may need to convey the physical root sequence of the first root sequence which could be for example 0 to 137, and the cyclic shift parameter $N_{CS}$ which may vary for example from 0 to 15. There are just 2208 different preamble sets, which could be generated with those constraints (138*16=2208). To convey both the $N_{CS}$ and the first root sequence to a user device, the gNB may need to send 12 bits. Furthermore, the user device may need to store tables to map the $N_{CS}$ and the first root sequence to a specific preamble set, which uses consecutive root sequences.

In order to solve the restrictions mentioned above caused by the current PRACH solution, one could synthetize preamble sets, where each preamble has an arbitrary root sequence and cyclic shift. To indicate a preamble set of 64 preambles, each preamble having an arbitrary root sequence and cyclic shift, we would need to use 64 ($\lceil\log_2 138\rceil+\lceil\log_2 137\rceil$)=1024 bits, given the current PRACH setup. 1024 bits may be too large to include in Msg1. The overhead increases linearly with the increased number of preambles in the preamble set. The overhead may be much larger for the long format, where the sequence length is 838. This may be a limitation for example for future 6G systems, where we envision many IoT devices attempting to establish connection, and gNBs with a very large number of subcells.

Some example embodiments may provide such scalability and address the complexity problem. Some example embodiments may enable conveying any arbitrary preamble sets to a user device, where a given preamble may have an arbitrary root sequence and cyclic shift. Such flexibility may be beneficial for example for 6G and beyond, where support for a large number of IoT devices and mobile access points may be needed. In addition, added quality requirements such as minimization of PRACH capacity shortfall, interference, and range limitation may be needed. Additional examples include, but are not limited to: remotely controlled vehicles such as drones, and massive number of connected augmented reality (AR) devices.

Some example embodiments may enable the following: communication with the user device where arbitrary preamble sets are used, compression of said arbitrary preamble set, and enabling the user device to create a preamble set that is suitable to be sent in Msg1.

Figure 2:
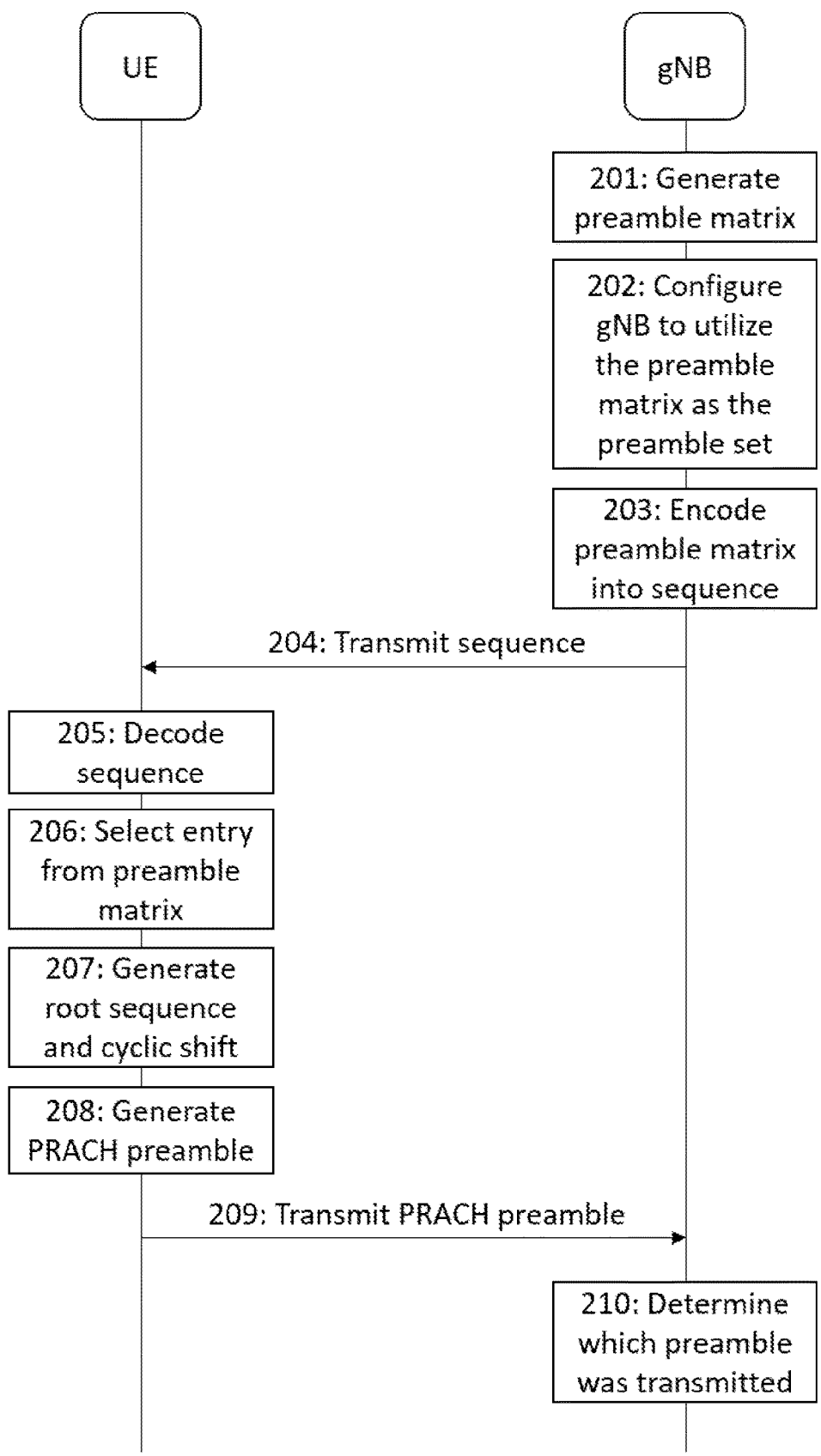
FIG. 2 illustrates a signaling diagram according to an example embodiment.

FIG. 2 illustrates a signaling diagram according to an example embodiment. As described above, a given random-access preamble in a preamble set may be uniquely identified with the physical root sequence index and cyclic shift. In this example embodiment, the preamble set may be identified, for example, as the non-zero entries of a two-dimensional preamble matrix (denoted as M), where rows indicate the cyclic shifts ($N_{CS}$) and columns indicate root sequences (or vice versa). In other words, a given non-zero entry in the matrix indicates a unique random-access preamble within the preamble set. Alternatively, any other value or symbol may be used instead of the non-zero entries to indicate the random-access preambles. If the gNB has multiple subcells, each using orthogonal preamble sets, the same preamble matrix may be used to represent all the preamble sets used by all of the subcells of the gNB.

Referring to FIG. 2, in block 201, a network element (e.g., a gNB or radio unit) of a radio access network generates a preamble matrix comprising a plurality of entries, wherein at least a subset of the plurality of entries indicate random-access preambles. For example, the preamble matrix may be generated randomly or based on studies, or based on number of neighboring gNBs or UEs.

The plurality of entries may comprise at least two sets of values or symbols, and the subset of entries (which indicate the random-access preambles) may comprise one set of values or symbols from the at least two sets of values or symbols. For example, the plurality of entries may comprise binary entries (ones and zeroes), and the non-zero entries, i.e., values of 1, in the preamble matrix may indicate the random-access preambles, in which case the zero entries, i.e., values of 0, do not indicate the random-access preambles. Alternatively, the zero entries, i.e., values of 0, in the preamble matrix may indicate the random-access preambles, in which case the non-zero entries do not indicate the random-access preambles. Alternatively, instead of ones and zeroes, the preamble matrix may comprise any two sets of symbols (e.g., A and B, Y and Z, 1 and 5), where one identifies the root sequence and cyclic shift of a given random-access preamble, and the other does not.

For example, the rows of the preamble matrix may indicate cyclic shifts of the random-access preambles, and the columns of the preamble matrix may indicate root sequences of the random-access preambles. Alternatively, the columns of the preamble matrix may indicate cyclic shifts of the random-access preambles, and the rows of the preamble matrix may indicate root sequences of the random-access preambles.

For generating the preamble matrix, the network element may select a parameter value denoted as $N_R$ to represent the maximum number of physical root sequences to be generated, for example as dictated by vendor and/or standards. As an example, the current NR standard has 138 such logical root sequences varying from 0 . . . 137, in which case there may be 138 columns in the preamble matrix (in case the columns are used to indicate the root sequences). However, the number of root sequences may also be higher or lower than 138.

Furthermore, the network element may select a parameter value denoted as $N_{CS}$ to represent the number of possible cyclic shifts, for example as dictated by vendor and/or standards.

The preamble matrix may then be generated as an N-dimensional matrix (e.g., $N_R \times N_{CS}$ or $N_{CS} \times N_R$ or $1 \times N_R N_{CS}$ or $N_R N_{CS} \times 1$) based on the parameter values $N_R$ and $N_{CS}$. For example, in an $N_{CS} \times N_R$ preamble matrix, the number of rows in the preamble matrix may equal the parameter value $N_{CS}$, and the number of columns in the preamble matrix may equal the parameter value $N_R$. As another example, in an $N_R \times N_{CS}$ preamble matrix, the number of rows in the preamble matrix may equal the parameter value $N_R$, and the number of columns in the preamble matrix may equal the parameter value $N_{CS}$.

Table 1 below presents a non-limiting example of the preamble matrix. However, it should be noted that the preamble matrix may also be different than shown in Table 1 (e.g., the number of rows and columns may be different, and the entries may be different). The binary preamble matrix comprises a plurality of entries with a value of 0 or 1. In this example, a given non-zero entry, i.e., an entry with a value of 1, represents a unique random-access preamble within the preamble set. That is, the row and column of a given non-zero entry uniquely identifies a random-access preamble. As an example, a non-zero entry at row i and column j indicates the use of sequence j after being cyclic shifted by i elements. The number of non-zero entries in the preamble matrix may equal the number of random-access preambles in the preamble set.

TABLE 1

| | Physical root sequence index | | | | |
|---|---|---|---|---|---|
| Cyclic shift | 0 | 0 | 1 | ... | 0 |
| | 0 | 0 | 1 | ... | 0 |
| | 1 | 0 | 1 | ... | 0 |
| | 0 | 1 | 1 | ... | 0 |

In block 202, the network element is configured to utilize the preamble matrix as the preamble set for detecting the random-access preambles indicated, for example, by the non-zero or zero entries of the preamble matrix. For example, the configuration may be done by the control plane. Alternatively, the configuration may be done during a software setup procedure or (re)boot, etc. by the network element (e.g., gNB).

In block 203, the network element encodes the preamble matrix into a sequence. The sequence may be denoted as s herein. For example, the network element may encode the preamble matrix M to a binary sequence s of length L through an artificial neural network, hashing, or any other function whose purpose is to produce a smaller, alternate representation of the preamble matrix M. This sequence may be reduced to bits. The length L may refer to the number of bits in the sequence s. The sequence s may represent a compressed version of the preamble matrix M. For example, the sequence s may be a hash or a binary vector. Alternatively, there may be no compression, or the sequence may even be expanded, so that the output of the encoder is larger than its input.

In block 204, the network element transmits the sequence s to one or more user devices. For example, the network element may broadcast the sequence s in a system information block (SIB) packet. The one or more user devices receive the sequence s from the network element. The sequence s may be used to indicate to the one or more user devices which preamble set has been used at the network element.

In block 205, the one or more user devices decode the sequence s. For example, the one or more user devices may pass the sequence s through a decoder, which outputs the preamble matrix, or a specific root sequence and cyclic shift.

In block 206, in case the decoder outputs a preamble matrix, the one or more user devices may select an entry from the at least subset of entries comprised in the decoded preamble matrix, wherein the at least subset of entries refers to the entries indicating the random-access preambles. For example, the one or more user devices may select the entry randomly.

In block 207, the one or more user device generate a root sequence and a cyclic shift based at least partly on the decoding. For example, the root sequence and the cyclic shift may be generated based on the row and the column of the selected entry in the decoded preamble matrix. Alternatively, the decoder may output the root sequence and the cyclic shift directly from the sequence s.

In block 208, the one or more user devices generate a random-access preamble based on the generated root sequence and cyclic shift. The random-access preamble may also be called a PRACH preamble or a RACH preamble.

In block 209, the one or more user devices may initiate a random-access procedure by transmitting the generated random-access preamble to the network element. The random-access preamble may be applied in any random-access procedure. For example, the random-access preamble may be transmitted in Msg1 (in 4-step random-access procedure) or MsgA (in 2-step random-access procedure). The network element receives the random-access preamble from the one or more user devices.

In block 210, the network element determines which of the random-access preamble(s) in the preamble set has been transmitted by the one or more user devices. The network element may transmit a random-access response or MsgB to the one or more user devices in response to receiving the random-access preamble.

Figure 3:
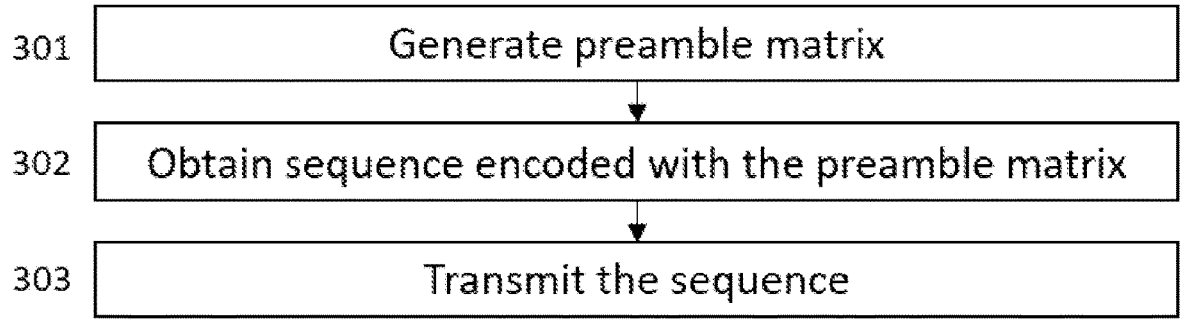
FIG. 3 illustrates a flow chart according to an example embodiment.

FIG. 3 illustrates a flow chart according to an example embodiment of a method performed by an apparatus such as, or comprising, or comprised in, a network element of a radio access network. For example, the network element may correspond to the access node 104 of FIG. 1, or a radio unit.

Referring to FIG. 3, in block 301, a preamble matrix comprising a plurality of entries is generated, wherein at least a subset of the plurality of entries indicate random-access preambles.

The rows of the preamble matrix may indicate cyclic shifts of the random-access preambles and columns of the preamble matrix may indicate root sequences of the random-access preambles. Alternatively, the rows may indicate the root sequences and the columns may indicate the cyclic shifts.

The plurality of entries may comprise at least two sets of values or symbols, and the subset may comprise one set of values or symbols from the at least two sets of values or symbols.

In block 302, a sequence encoded with the preamble matrix is obtained. For example, the apparatus itself may encode the preamble matrix into the sequence, or the encoding may be performed at another entity, for example in a cloud.

In block 303, the sequence is transmitted to one or more user devices.

Figure 4:
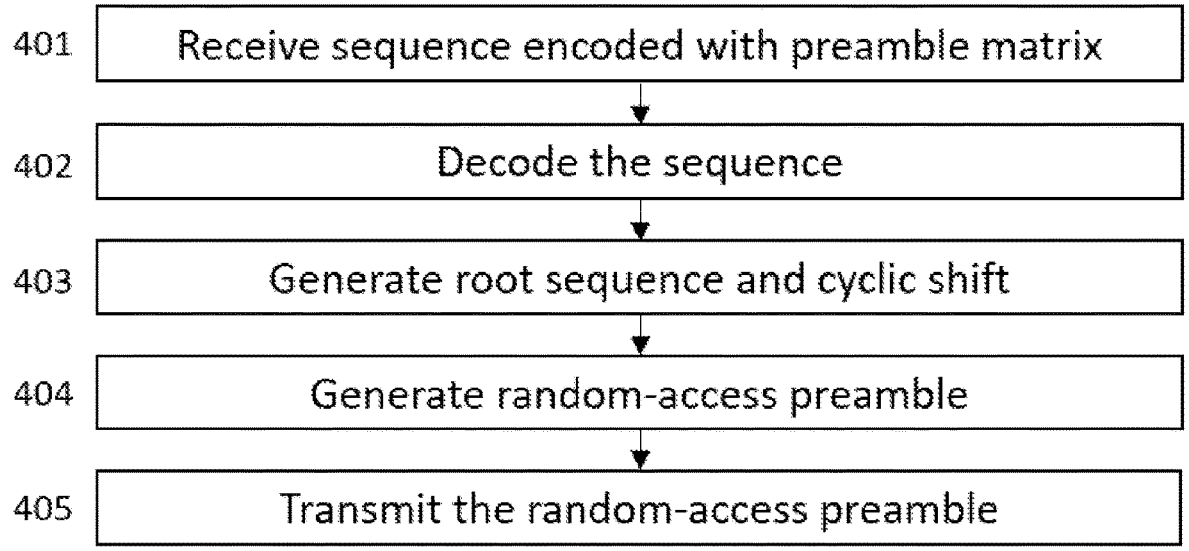
FIG. 4 illustrates a flow chart according to an example embodiment.

FIG. 4 illustrates a flow chart according to an example embodiment of a method performed by an apparatus such as, or comprising, or comprised in, a user device. The user device may also be called a subscriber unit, mobile station, remote terminal, access terminal, user terminal, terminal device, or user equipment (UE). The user device may correspond to one of the user devices 100, 102 of FIG. 1.

Referring to FIG. 4, in block 401, a sequence is received from a network element of a radio access network, wherein the sequence is encoded with a preamble matrix comprising a plurality of entries, wherein at least a subset of the plurality of entries indicate random-access preambles.

The rows of the preamble matrix may indicate cyclic shifts of the random-access preambles and columns of the preamble matrix may indicate root sequences of the random-access preambles. Alternatively, the rows may indicate the root sequences and the columns may indicate the cyclic shifts.

The plurality of entries may comprise at least two sets of values or symbols, and the subset may comprise one set of values or symbols from the at least two sets of values or symbols.

In block 402, the sequence is decoded.

In block 403, a root sequence and a cyclic shift are generated based at least partly on the decoding.

In block 404, a random-access preamble is generated based on the root sequence and the cyclic shift.

In block 405, the random-access preamble is transmitted to the network element.

The blocks, related functions, and information exchanges (messages) described above by means of FIGS. 2-4 are in no absolute chronological order, and some of them may be performed simultaneously or in an order differing from the described one. Other functions can also be executed between them or within them, and other information may be sent, and/or other rules applied. Some of the blocks or part of the blocks or one or more pieces of information can also be left out or replaced by a corresponding block or part of the block or one or more pieces of information.

Figure 5:
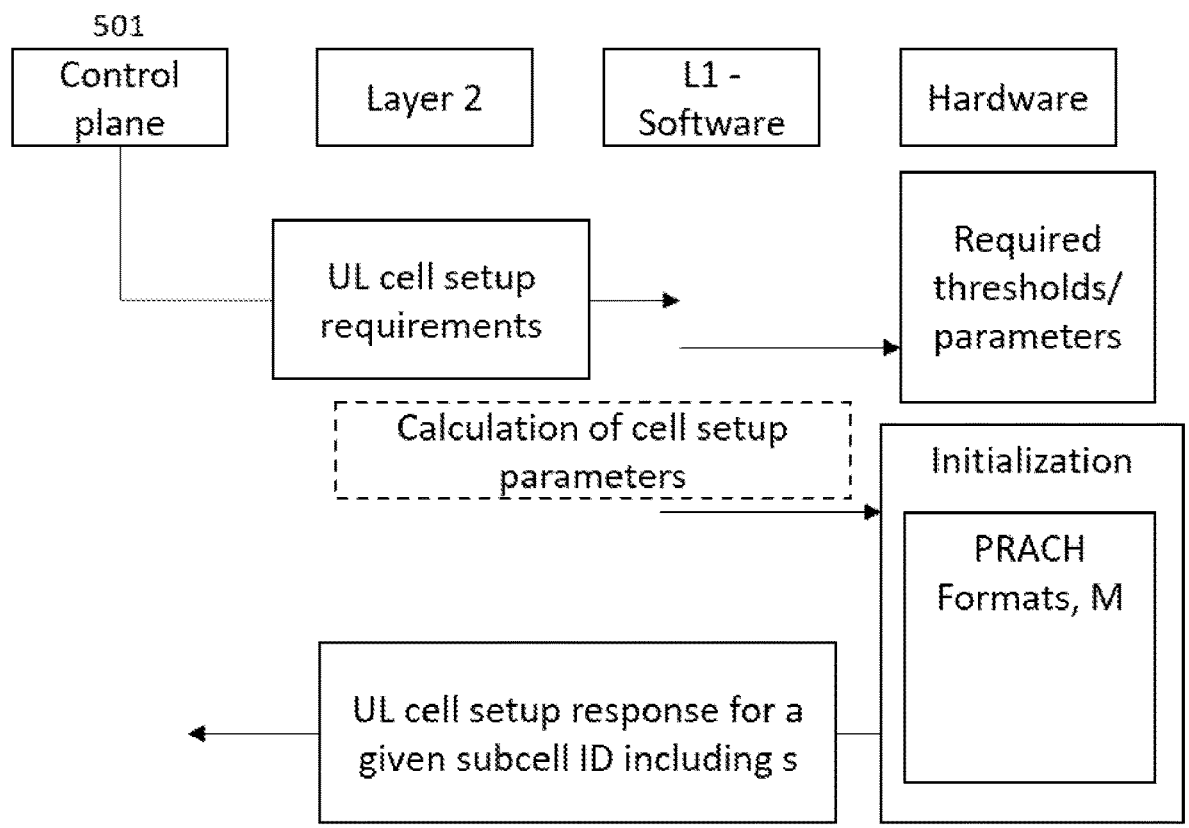
FIG. 5 illustrates an example for configuring a network element to utilize a preamble matrix as a preamble set.

FIG. 5 illustrates an example of how the network element may be configured to utilize the preamble matrix as the preamble set in block 202 of FIG. 2. Referring to FIG. 5, the control plane 501 configures the PRACH receivers to be able to detect the random-access preambles as described by the preamble matrix M. The encoder at the network element (e.g., gNB) or in higher layers or cloud may map the preamble matrix into the sequence s. In other words, the sequence s does not necessarily need to be calculated at the gNB or radio unit, as it may alternatively be computed in cloud, Layer 3, or Layer 2 software, for example. For preamble set initialization, the layer may signal the sequence s and preamble matrix M to the gNB.

Figure 6:
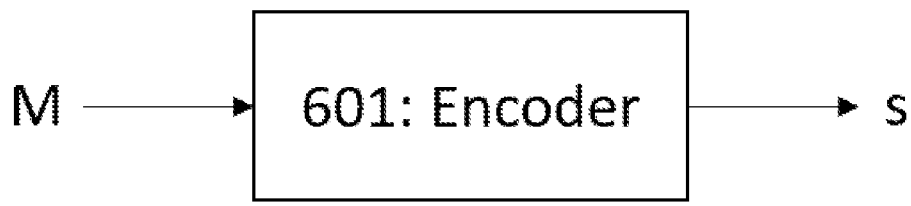
FIG. 6 illustrates an example for encoding a preamble matrix into a sequence.

FIG. 6 illustrates an example for encoding the preamble matrix M into the sequence s at the network element in block 203 of FIG. 2 or block 302 of FIG. 3. Referring to FIG. 6, the preamble matrix M is provided as input to an encoder 601. The sequence s is then received as output from the encoder 601. For example, the encoder 601 may be run at the network element (e.g., gNB) or in a cloud server. In case the encoder is run in cloud, the gNB may save the relevant sequences s indicating a preamble set. The encoder 601 may compress the preamble matrix M to the binary sequence s. The encoder 601 may comprise an artificial neural network, hashing, or any other function whose purpose is to produce a smaller, alternate representation of the preamble matrix M.

Figure 7A:
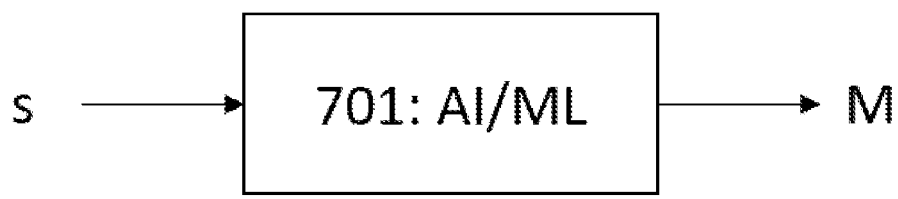
FIG. 7A illustrates a first decoder option for decoding the preamble matrix from the sequence.

FIG. 7A illustrates a first decoder option for decoding the preamble matrix M from the sequence s at a user device in block 205 of FIG. 2 or block 402 of FIG. 4. In the first decoder option, an artificial intelligence (AI) or machine learning (ML) model 701 at the user device maps the hash or sequence s to the preamble matrix M. In other words, the sequence s may be provided as input to the AI/ML model 701, and the AI/ML model 701 may output the preamble matrix M. For example, the AI/ML model 701 may comprise at least one convolutional neural network (CNN) layer, or at least one fully connected (FC) layer, or at least one recurrent neural network (RNN) layer. With the preamble matrix M as an input, the user device may then select a non-zero entry from the preamble matrix (e.g., randomly) and generate a preamble root sequence and cyclic shift according to the row and column of the selected non-zero entry in the preamble matrix M. Alternatively, the decoder may select the non-zero entry from the preamble matrix decoded by the AI/ML model 701. The user device may not need to save any preamble matrix M. Its decoder function decodes the sequence s into the preamble matrix M.

Figure 7B:
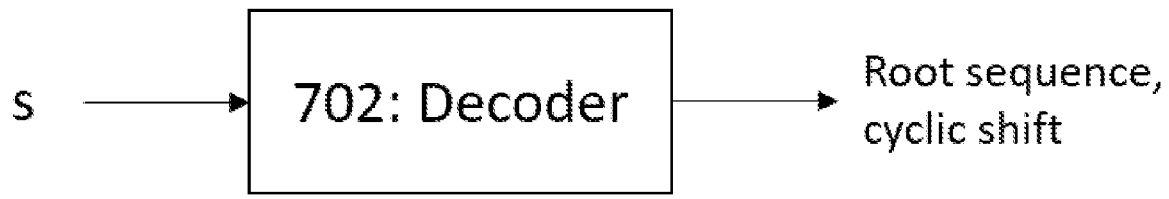
FIG. 7B illustrates a second decoder option for decoding the preamble matrix from the sequence.

FIG. 7B illustrates a second decoder option for decoding the preamble matrix M from the sequence s at a user device in block 205 of FIG. 2 or block 402 of FIG. 4. In the second decoder option, the network vendor may provide a decoder solution 702, which generates a random preamble identifier (root sequence, cyclic shift) directly from the sequence s. In other words, the sequence s may be provided as input to the decoder 702, and the decoder 702 may then output a root sequence and a cyclic shift to be used by the user device for generating the corresponding random-access preamble.

Figure 8:
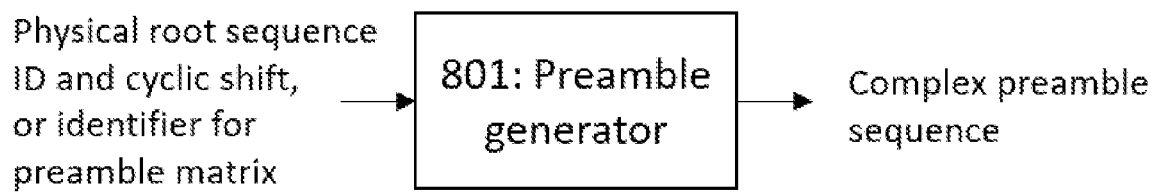
FIG. 8 illustrates an example for generating a random-access preamble.

FIG. 8 illustrates an example for generating the random-access preamble at a user device in block 207 of FIG. 2 or block 404 of FIG. 4. The user device creates the random-access preamble with the selected root sequence and cyclic shift. Referring to FIG. 8, the physical root sequence ID and the cyclic shift, or an identifier for the preamble matrix M, may be provided as input to a preamble generator function 801. The preamble generator function 801 may then output the random-access preamble. This functionality may alternatively be replaced by an AI/ML model and integrated into the decoder functionality above.

As an example, let us assume a $(N_R \times N_{CS})=(138 \times 138)$ preamble matrix to describe all possible preamble sets to be generated with 138 root sequence of length 139. The non-zero entries in the preamble matrix may uniquely identify the preambles used in the preamble set. There are $2^{138 \times 138}$ such preamble sets with up to 19044 preambles in a given preamble set. Thus, it may be infeasible to save all possible preamble sets at the user device and convey the used preamble set to the user device. In case the user device is not capable of saving the preamble set, to indicate a single preamble, the gNB may need to send 16 bits ($\lceil \log_2 138 \rceil + \lceil \log_2 137 \rceil = 16$). A preamble set with 64 preambles would thus require $16 \times 64 \approx 1024$ bits in total. This may be large in size for the SIB packet for PRACH purposes.

As a non-limiting example, in some example embodiments, 4000 preamble sets may be selected from among $2^{138 \times 138}$ possible preamble sets, with 60 to 100 preambles in a given preamble set. The selected 138×138 preamble matrix M may then be encoded into a sequence s of just 128 bits. The user device may then decode the sequence s into the preamble matrix M and generate a random-access preamble.

Some example embodiments may be used for any PRACH receiver, as long as a version of the preamble matrix described by M may be created, wherein preamble support is described. Therefore, some example embodiments may be deployed at any gNB for any preamble set.

Furthermore, some example embodiments may be used to indicate any sequence to the user device that is lookup table based. As an example, the same approach could be used in the uplink/downlink patterns for dynamic time-division duplexing (TDD).

Some example embodiments may also be backward-compatible with legacy PRACH preamble sets. To convey a preamble set, the gNB may convey the physical root sequence of the first root sequence which may range for example from 0 to 137, and the cyclic shift parameter ($N_{CS}$) which may vary for example from 0 to 15. There may be 2208 (138*16=2208) different preamble sets, which could be generated with these parameters. To convey both the cyclic shift parameter $N_{CS}$ and the first root sequence, the gNB may need to send 12 bits. In some example embodiments, the preamble matrices M corresponding to the 2208 preamble sets could be encoded using a binary sequence of 8 bits per preamble matrix. This reduces the number of bits to convey the preamble sequence by 33%.

Figure 9:
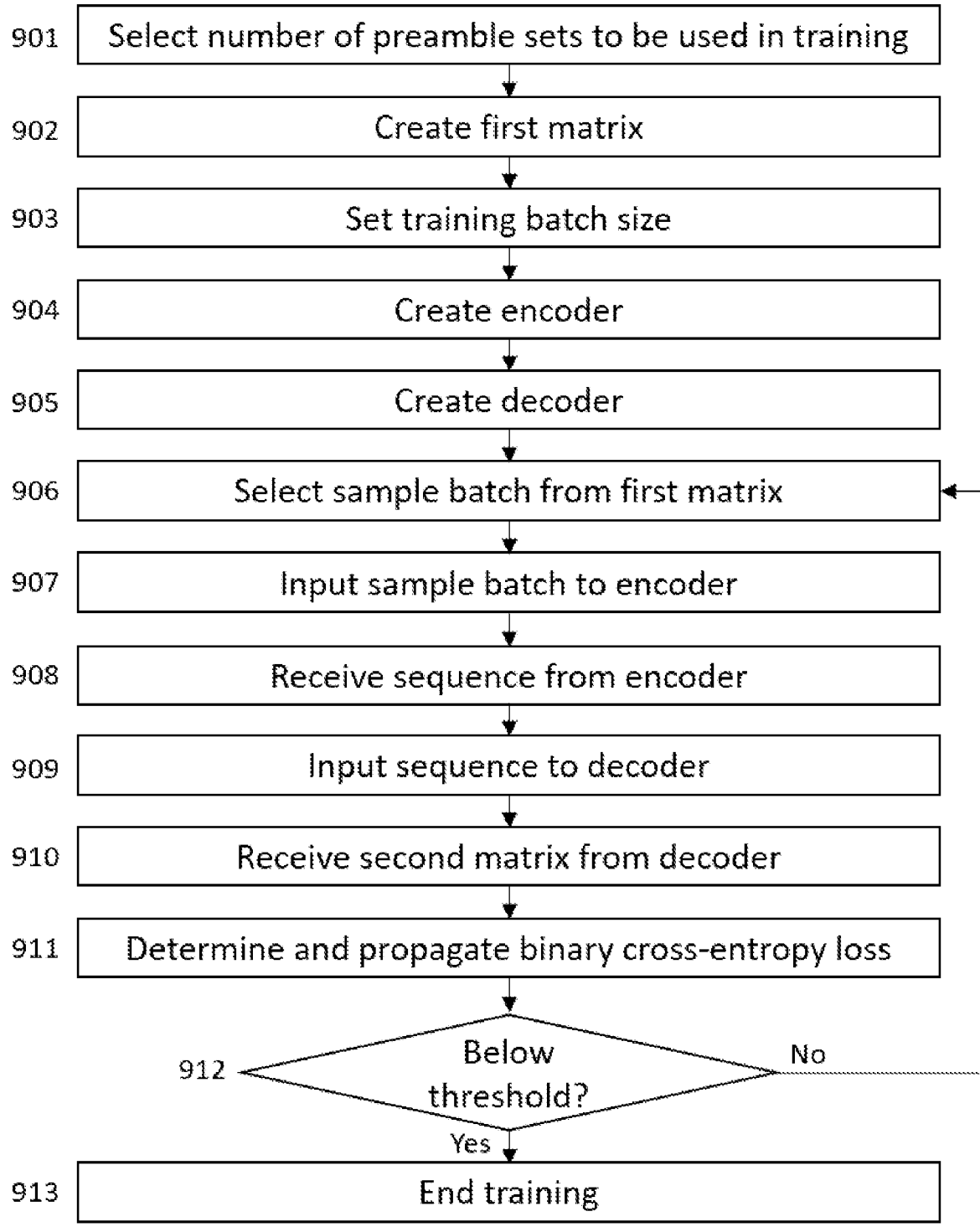
FIG. 9 illustrates a flow chart according to an example embodiment.

FIG. 9 illustrates a flow chart according to an example embodiment of a method for training an artificial neural network, for example an autoencoder, comprising a concatenation of the encoder 601 and decoder 701, 702 described above. That is, the encoder and the decoder may be trained together, but they may be separate neural networks. The trained encoder may be run at the gNB or in the cloud, and the trained decoder may be run at a user device. The autoencoder may need to be trained just once and could be used across many sites and user devices. The training may be performed at any computing device.

Referring to FIG. 9, in block 901, a number of different preamble sets to be used in the training is selected. For example, the number of preamble sets may be selected based on a user input indicating the number of preamble sets. Alternatively, the number of preamble sets may be adaptively selected by a computer program for example based on the number of neighboring gNBs or UEs. The selected number of preamble sets is denoted as $N_M$ herein.

As a non-limiting example, the number of preamble sets may be selected as 4000. However, the number of preamble sets may also be higher or lower than 4000.

In block 902, a first matrix (denoted as S) is created, wherein the first matrix comprises a plurality of random-access preamble sets equal to the selected number of preamble sets. For example, the number of rows in the first matrix may equal the number of preamble sets, and the number of columns in the first matrix may equal a number of root sequences multiplied by a number of cyclic shifts. In other words, the shape of the first matrix S may be $[N_M, N_R*N_{CS}]$. The first matrix may comprise binary entries, i.e., values of 0 or 1. Alternatively, any two symbols may be used instead of ones and zeroes.

In block 903, the training batch size is set equal to a value denoted as B. For example, the training batch size may be set based on a user input indicating the value B. Alternatively, the training batch size may be set by a computer program.

In block 904, an encoder with at least one neural network layer is created. For example, the at least one neural network layer of the encoder may comprise at least one fully connected (FC) layer and/or at least one convolutional neural network (CNN) layer.

In block 905, a decoder with at least one neural network layer is created. For example, the at least one neural network layer of the decoder may comprise at least one FC layer and/or at least one CNN layer.

In block 906, a sample batch (denoted as X) is selected from the first matrix S, wherein the batch size of the sample batch is equal to the training batch size B. For example, the sample batch may be selected randomly. The sample batch may be a flattened version of the preamble matrix M, which the encoder learns to encode, and the decoder learns to decode based on the encoder output.

In block 907, the sample batch X is provided as an input to the encoder.

In block 908, a sequence (denoted as $Y_{EN}$) is received as an output from the encoder, wherein the sequence is encoded with the sample batch. The sequence may represent a compressed or uncompressed version of the sample batch X. For example, the encoder may compress the matrix (sample batch) to a binary sequence with a length of 128 bits. In this case, the shape of the compressed sequence may be [1, 128].

In block 909, the sequence $Y_{EN}$ is provided as an input to the decoder.

In block 910, a second matrix (denoted as $Y_{DE}$) is received as an output from the decoder. The shape of the second matrix $Y_{DE}$ may be, for example, $[N_M, N_R*N_{CS}]$. That is, the number of rows in the second matrix may equal the number of preamble sets, and the number of columns in the second matrix may equal the number of root sequences multiplied by the number of cyclic shifts.

In block 911, a binary cross-entropy loss is determined. The binary cross-entropy may be used as a loss function to compare the sample batch and the second matrix in order to measure the error in reconstructing the sample batch from the compressed sequence. The binary cross-entropy loss is denoted as $L_{BCE}(Y_{DE}, Y_{true})$ herein. $Y_{true}$ indicates whether the reconstructed matrix matches the original matrix (sample batch). The binary cross-entropy loss is propagated to the decoder and the encoder for example via an ADAM optimizer or any other optimizer.

In block 912, the binary cross-entropy loss is compared to a threshold value denoted as e. For example, the threshold value e may be less than or equal to $1e^{-5}$ (i.e., $e \leq 1e^{-5}$).

If the binary cross-entropy loss is not below the threshold value (block 912: no), then blocks 906-912 are repeated until the binary cross entropy loss is below the threshold value. In other words, the apparatus may repeat the selection of the sample batch, the inputting of the sample batch, the receiving of the compressed sequence, the inputting of the compressed sequence, the receiving of the second matrix, the determining, and the propagating until the binary cross-entropy loss is below the threshold value.

This way, the artificial neural network may be trained to minimize the reconstruction error for example by performing gradient descent on the loss function via the ADAM optimizer.

In block 913, if the binary cross-entropy loss is below the threshold value, then the training is ended.

Figure 10:
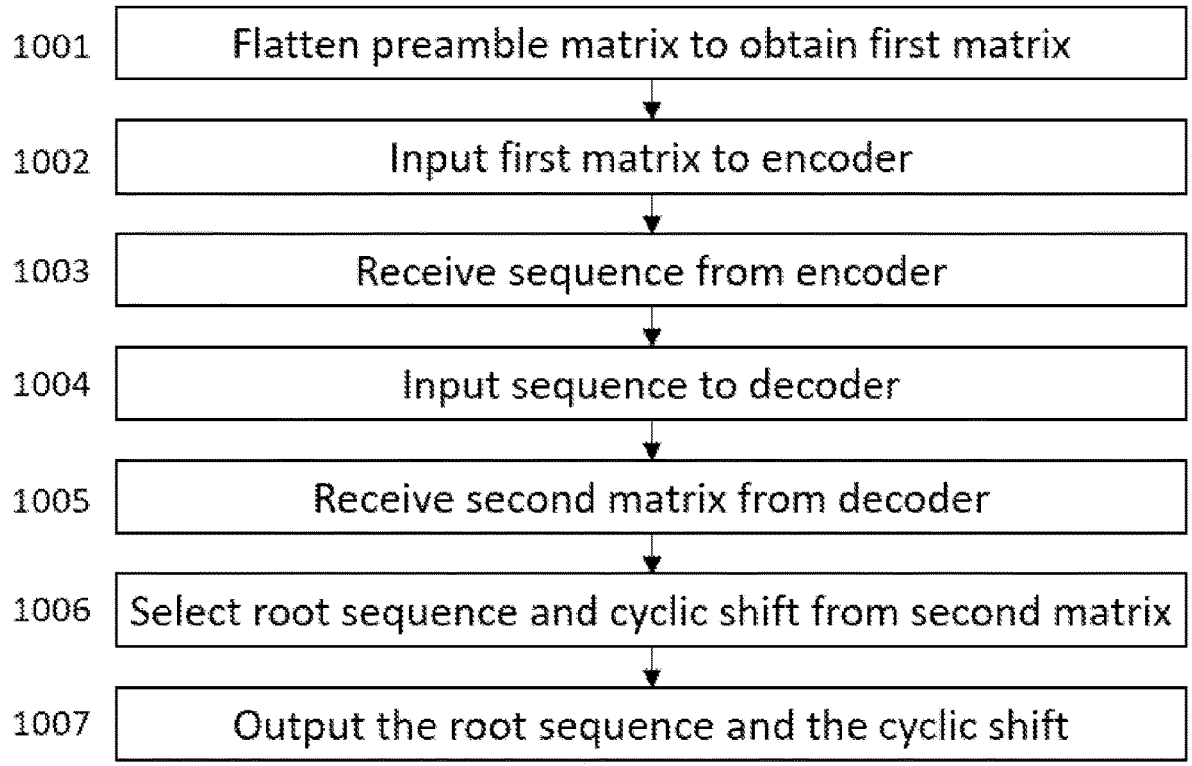
FIG. 10 illustrates a flow chart according to an example embodiment.

FIG. 10 illustrates a flow chart according to an example embodiment of a method for the inference with the artificial neural network trained based on the method of FIG. 9.

Referring to FIG. 10, in block 1001, a preamble matrix M is flattened to obtain a resulting first preamble matrix X, whose shape is $[1, N_R*N_{CS}]$. The flattening may be done to reduce the number of parameters, kernel sizes, etc.

In block 1002, the first preamble matrix X is fed as an input to an encoder with at least one neural network layer. For example, the at least one neural network layer of the encoder may comprise at least one FC layer and/or at least one CNN layer.

In block 1003, a compressed sequence $Y_{EN}$ of the first preamble matrix X is received as an output from the encoder. The shape of the compressed sequence may be, for example [1, 128].

In block 1004, the compressed sequence $Y_{EN}$ is fed as an input to a decoder with at least one neural network layer.

In block 1005, a second preamble matrix $Y_{DE}$ is received as an output from the decoder, wherein the shape of the second preamble matrix $Y_{DE}$ is $[1, N_R*N_{CS}]$.

In block 1006, a pair $(n_R, n_{CS})$ of a root sequence and a cyclic shift is selected from the second preamble matrix $Y_{DE}$, wherein $n_R < N_R$, and $n_{CS} < N_{CS}$. For example, the pair may be selected randomly.

In block 1007, the selected pair $(n_R, n_{CS})$ is provided as an output from the artificial neural network.

Alternatively, instead of flattening, tensors may be created as input and tensors may be created as output. In this case, the options may be: N: batch size, C: channels, H: height, W: width->(N, C, H, W)->(1, 1, $N_R$, $N_{CS}$).

Figure 11:
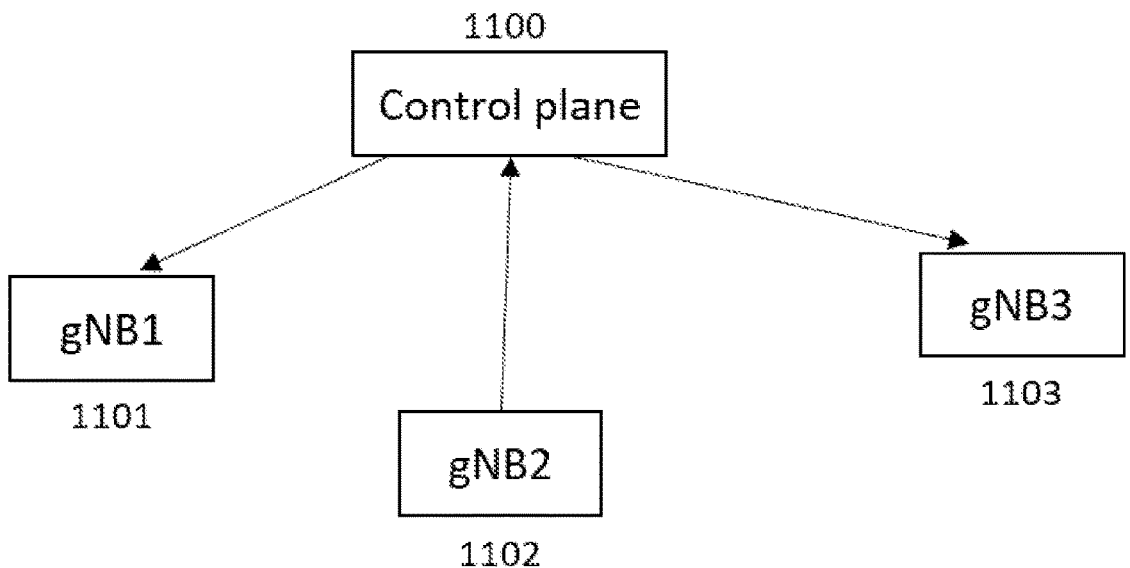
FIG. 11 illustrates an example scenario.

FIG. 11 illustrates an example scenario, wherein some example embodiments may be used to dynamically allocate root sequences between gNBs. Some example embodiments may enable to change this allocation dynamically between different gNBs and also on the same gNB between different preamble sets. Some example embodiments may also enable the use of arbitrary preamble set sizes in contrast to current networks, where preamble sets may have at most 64 preambles. Some example embodiments may solve the problem of limited, not orthogonal enough PRACH sequences, by allowing preamble sets of arbitrary sizes and with arbitrary cyclic shifts.

Referring to FIG. 11, the control plane 1100 may determine the preamble matrices for the gNBs 1101, 1102, 1103. The gNBs may have capabilities to identify UE density, and to identify collisions. The compressed sequence s for a given preamble matrix M may be computed, for example, in cloud, Layer 3 or Layer 2 Software.

In FIG. 11, a first gNB (gNB1) 1101 may be located in a sparsely populated area, and thus the preamble matrix M for gNB1 may be very sparse and change seldomly. In other words, the number of preambles may be lower if there is a lower number of UEs, since the collision probability (i.e., two UEs selecting the same preamble) is lower in this case.

A second gNB (gNB2) 1102 may be located in a densely populated area, and thus the preamble matrix M for gNB2 may change more often and be less sparse compared to the preamble matrix of gNB1.

A third gNB (gNB3) 1103 may be located in a problematic cell acquisition area, and thus the preamble matrix M for gNB3 may change according to the problem resolution metrics (e.g., sum of collisions over a 10-minute period).

Figure 12:
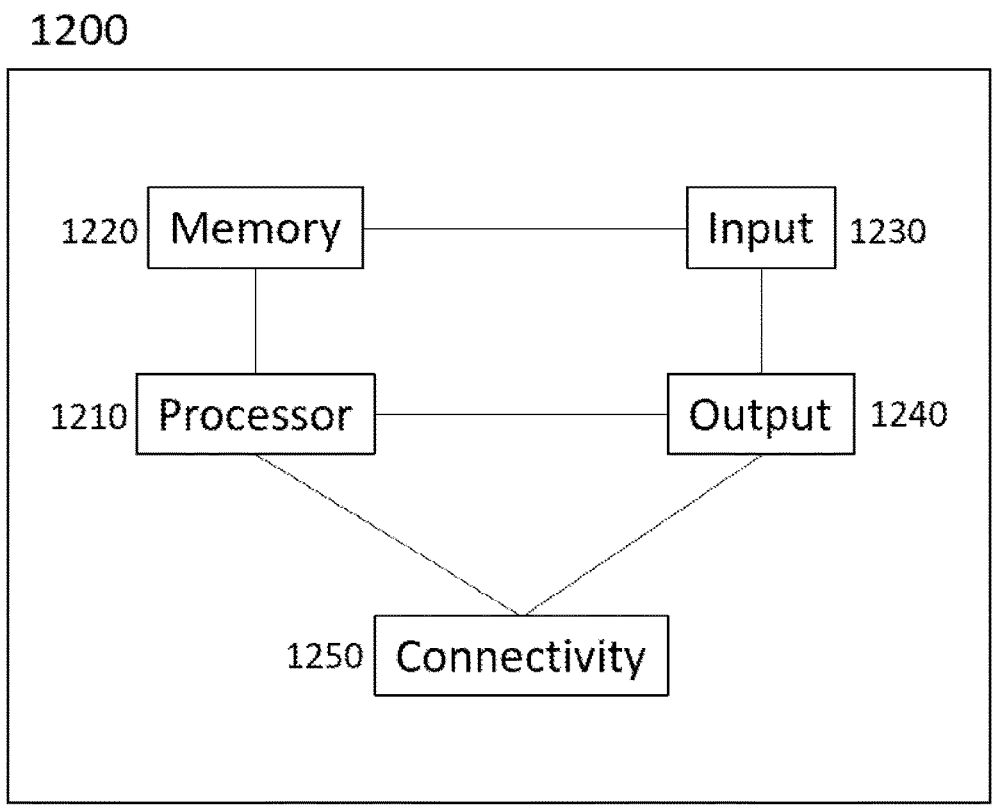
FIG. 12 illustrates an example of an apparatus.

FIG. 12 illustrates an example of an apparatus 1200 comprising means for performing the method of FIG. 4 or any other example embodiment described above. For example, the apparatus 1200 may be an apparatus such as, or comprising, or comprised in, a user device. The user device may correspond to one of the user devices 100, 102 of FIG. 1. The user device may also be called a subscriber unit, mobile station, remote terminal, access terminal, user terminal, terminal device, or user equipment (UE).

The apparatus 1200 comprises at least one processor 1210. The at least one processor 1210 interprets computer program instructions and processes data. The at least one processor 1210 may comprise one or more programmable processors. The at least one processor 1210 may comprise programmable hardware with embedded firmware and may, alternatively or additionally, comprise one or more application-specific integrated circuits (ASICs).

The at least one processor 1210 is coupled to at least one memory 1220. The at least one processor is configured to read and write data to and from the at least one memory 1220. The at least one memory 1220 may comprise one or more memory units. The memory units may be volatile or non-volatile. It is to be noted that there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The term "non-transitory," as used herein, is a limitation of the medium itself (i.e., tangible, not a signal) as opposed to a limitation on data storage persistency (e.g., RAM vs. ROM). The at least one memory 1220 stores computer readable instructions that are executed by the at least one processor 1210 to perform one or more of the example embodiments described above. For example, non-volatile memory stores the computer readable instructions, and the at least one processor 1210 executes the instructions using volatile memory for temporary storage of data and/or instructions.

The computer readable instructions may refer to computer program code.

The computer readable instructions may have been pre-stored to the at least one memory 1220 or, alternatively or additionally, they may be received, by the apparatus, via an electromagnetic carrier signal and/or may be copied from a physical entity such as a computer program product. Execution of the computer readable instructions by the at least one processor 1210 causes the apparatus 1200 to perform one or more of the example embodiments described above. That is, the at least one processor and the at least one memory storing the instructions may provide the means for providing or causing the performance of any of the methods and/or blocks described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer. The term "non-transitory," as used herein, is a limitation of the medium itself (i.e., tangible, not a signal) as opposed to a limitation on data storage persistency (e.g., RAM vs. ROM).

The apparatus 1200 may further comprise, or be connected to, an input unit 1230. The input unit 1230 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 1230 may comprise an interface to which external devices may connect to.

The apparatus 1200 may also comprise an output unit 1240. The output unit may comprise or be connected to one or more displays capable of rendering visual content, such as a light emitting diode (LED) display, a liquid crystal display (LCD) and/or a liquid crystal on silicon (LCoS) display. The output unit 1240 may further comprise one or more audio outputs. The one or more audio outputs may be for example loudspeakers.

The apparatus 1200 further comprises a connectivity unit 1250. The connectivity unit 1250 enables wireless connectivity to one or more external devices. The connectivity unit 1250 comprises at least one transmitter and at least one receiver that may be integrated to the apparatus 1200 or that the apparatus 1200 may be connected to. The at least one transmitter comprises at least one transmission antenna, and the at least one receiver comprises at least one receiving antenna. The connectivity unit 1250 may comprise an integrated circuit or a set of integrated circuits that provide the wireless communication capability for the apparatus 1200. Alternatively, the wireless connectivity may be a hardwired application-specific integrated circuit (ASIC). The connectivity unit 1250 may comprise one or more components, such as: power amplifier, digital front end (DFE), analog-to-digital converter (ADC), digital-to-analog converter (DAC), frequency converter, (de)modulator, and/or encoder/decoder circuitries, controlled by the corresponding controlling units.

It is to be noted that the apparatus 1200 may further comprise various components not illustrated in FIG. 12. The various components may be hardware components and/or software components.

Figure 13:
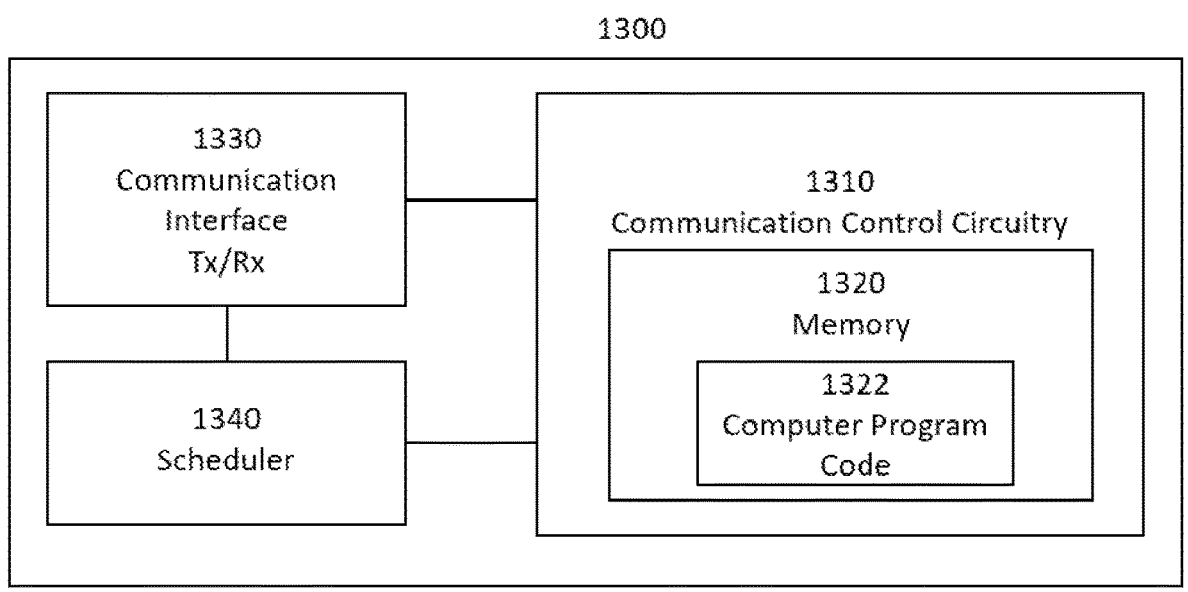
FIG. 13 illustrates an example of an apparatus.

FIG. 13 illustrates an example of an apparatus 1300 comprising means for performing the method of FIG. 3 or any other example embodiment described above. For example, the apparatus 1300 may be an apparatus such as, or comprising, or comprised in, a network element of a radio access network. For example, the network element may correspond to the access node 104 of FIG. 1, or a radio unit. The network element may also be referred to, for example, as a network node, a radio access network (RAN) node, a next generation radio access network (NG-RAN) node, a NodeB, an eNB, a gNB, a base transceiver station (BTS), a base station, an NR base station, a 5G base station, an access node, an access point (AP), a relay node, a repeater, an integrated access and backhaul (IAB) node, an IAB donor node, a distributed unit (DU), a central unit (CU), a baseband unit (BBU), a radio unit (RU), a radio head, a remote radio head (RRH), or a transmission and reception point (TRP).

The apparatus 1300 may comprise, for example, a circuitry or a chipset applicable for realizing one or more of the example embodiments described above. The apparatus 1300 may be an electronic device comprising one or more electronic circuitries. The apparatus 1300 may comprise a communication control circuitry 1310 such as at least one processor, and at least one memory 1320 storing instructions which, when executed by the at least one processor, cause the apparatus 1300 to carry out one or more of the example embodiments described above. Such instructions may, for example, include a computer program code (software) 1322 wherein the at least one memory and the computer program code (software) 1322 are configured, with the at least one processor, to cause the apparatus 1300 to carry out one or more of the example embodiments described above. Herein computer program code may in turn refer to instructions which, when executed by the at least one processor, cause the apparatus 1300 to perform one or more of the example embodiments described above. That is, the at least one processor and the at least one memory storing the instructions may provide the means for providing or causing the performance of any of the methods and/or blocks described above.

The processor is coupled to the memory 1320. The processor is configured to read and write data to and from the memory 1320. The memory 1320 may comprise one or more memory units. The memory units may be volatile or non-volatile. It is to be noted that there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The term "non-transitory," as used herein, is a limitation of the medium itself (i.e., tangible, not a signal) as opposed to a limitation on data storage persistency (e.g., RAM vs. ROM). The memory 1320 stores computer readable instructions that are executed by the processor. For example, non-volatile memory stores the computer readable instructions and the processor executes the instructions using volatile memory for temporary storage of data and/or instructions.

The computer readable instructions may have been pre-stored to the memory 1320 or, alternatively or additionally, they may be received, by the apparatus, via an electromagnetic carrier signal and/or may be copied from a physical entity such as a computer program product. Execution of the computer readable instructions causes the apparatus 1300 to perform one or more of the functionalities described above.

The memory 1320 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some example embodiments, structures of the frames used in the detected neighbour cells.

The apparatus 1300 may further comprise a communication interface 1330 comprising hardware and/or software for realizing communication connectivity according to one or more communication protocols. The communication interface 1330 comprises at least one transmitter (Tx) and at least one receiver (Rx) that may be integrated to the apparatus 1300 or that the apparatus 1300 may be connected to. The communication interface 1330 may comprise one or more components, such as: power amplifier, digital front end (DFE), analog-to-digital converter (ADC), digital-to-analog converter (DAC), frequency converter, (de)modulator, and/or encoder/decoder circuitries, controlled by the corresponding controlling units.

The communication interface 1330 provides the apparatus with radio communication capabilities to communicate in the cellular communication system. The communication interface may, for example, provide a radio interface to one or more user devices. The apparatus 1300 may further comprise another interface towards a core network such as the network coordinator apparatus or AMF, and/or to the access nodes of the cellular communication system.

The apparatus 1300 may further comprise a scheduler 1340 that is configured to allocate radio resources. The scheduler 1340 may be configured along with the communication control circuitry 1310 or it may be separately configured.

It is to be noted that the apparatus 1300 may further comprise various components not illustrated in FIG. 13. The various components may be hardware components and/or software components.

Figure 14:
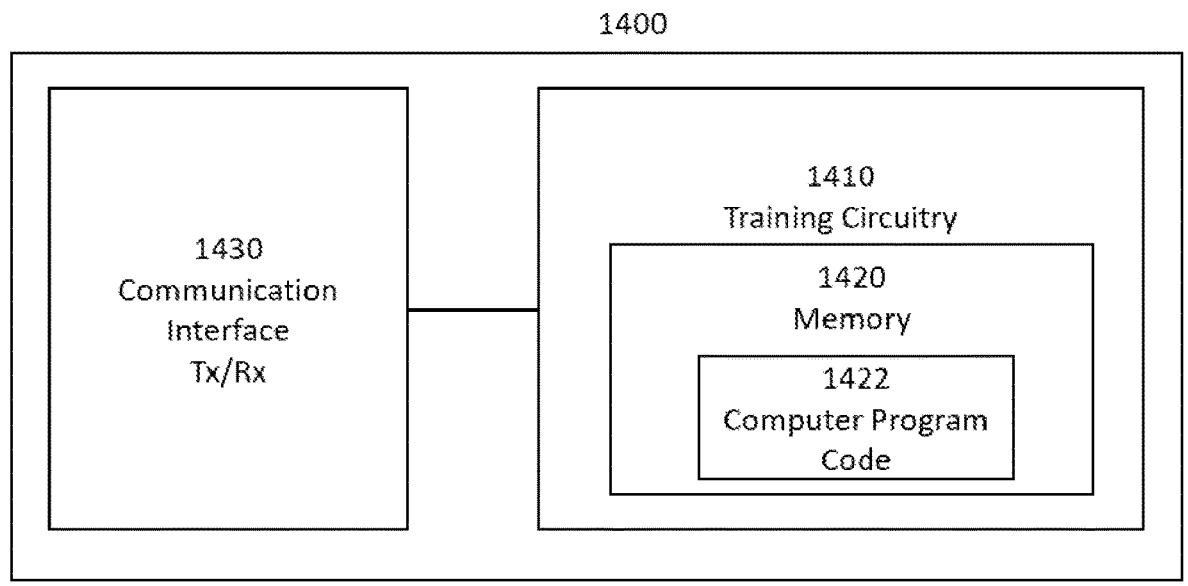
FIG. 14 illustrates an example of an apparatus.

FIG. 14 illustrates an example of an apparatus 1400 comprising means for performing the method of FIG. 9 or any other example embodiment described above. FIG. 14 may illustrate a computing device configured to carry out at least the functions described above for FIG. 9 in connection with training the artificial neural network. The apparatus 1400 may correspond to a receiver or a transceiver or subunit therein. The apparatus 1400 may correspond to any of elements 100, 102, 104, 108, 112 of FIG. 1, or a (sub)element within any of the elements 100, 102, 104, 108, 112 of FIG. 1.

The apparatus 1400 may comprise, for example, a circuitry or a chipset applicable for realizing one or more of the example embodiments described above. The apparatus 1400 may be an electronic device comprising one or more electronic circuitries. The apparatus 1400 may comprise a training circuitry 1410 such as at least one processor, and at least one memory 1420 storing instructions which, when executed by the at least one processor, cause the apparatus 1400 to carry out one or more of the example embodiments described above, such as the method of FIG. 9. Such instructions may, for example, include a computer program code (software) 1422 wherein the at least one memory and the computer program code (software) 1422 are configured, with the at least one processor, to cause the apparatus 1400 to carry out one or more of the example embodiments described above. Herein computer program code may in turn refer to instructions which, when executed by the at least one processor, cause the apparatus 1400 to perform one or more of the example embodiments described above. That is, the at least one processor and the at least one memory storing the instructions may provide the means for providing or causing the performance of any of the methods and/or blocks described above.

The processor is coupled to the memory 1420. The processor is configured to read and write data to and from the memory 1420. The memory 1420 may comprise one or more memory units. The memory units may be volatile or non-volatile. It is to be noted that there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The term "non-transitory," as used herein, is a limitation of the medium itself (i.e., tangible, not a signal) as opposed to a limitation on data storage persistency (e.g., RAM vs. ROM). The memory 1420 stores computer readable instructions that are executed by the processor. For example, non-volatile memory stores the computer readable instructions and the processor executes the instructions using volatile memory for temporary storage of data and/or instructions.

The computer readable instructions may have been pre-stored to the memory 1420 or, alternatively or additionally, they may be received, by the apparatus, via an electromagnetic carrier signal and/or may be copied from a physical entity such as a computer program product. Execution of the computer readable instructions causes the apparatus 1400 to perform one or more of the functionalities described above.

The memory 1420 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some example embodiments, structures of the frames used in the detected neighbour cells.

The apparatus 1400 may further comprise a communication interface 1430 comprising hardware and/or software for realizing communication connectivity according to one or more communication protocols. The communication interface 1430 comprises at least one transmitter (Tx) and at least one receiver (Rx) that may be integrated to the apparatus 1400 or that the apparatus 1400 may be connected to. The communication interface 1430 may comprise one or more components, such as: power amplifier, digital front end (DFE), analog-to-digital converter (ADC), digital-to-analog converter (DAC), frequency converter, (de)modulator, and/or encoder/decoder circuitries, controlled by the corresponding controlling units.

The communication interface 1430 provides the apparatus with radio communication capabilities to communicate in a wireless communication system and enable communication with one or more access nodes, one or more user devices (possibly via said plurality of access nodes) and/or one or more other network nodes or elements. The communication interface 1430 may enable the apparatus 1400 to transfer a fully trained artificial neural network or machine learning algorithm to another apparatus, for example to the apparatus 1200 or to the apparatus 1300.

It is to be noted that the apparatus 1400 may further comprise various components not illustrated in FIG. 14. The various components may be hardware components and/or software components.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s), software, and memory(ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Figure 15:
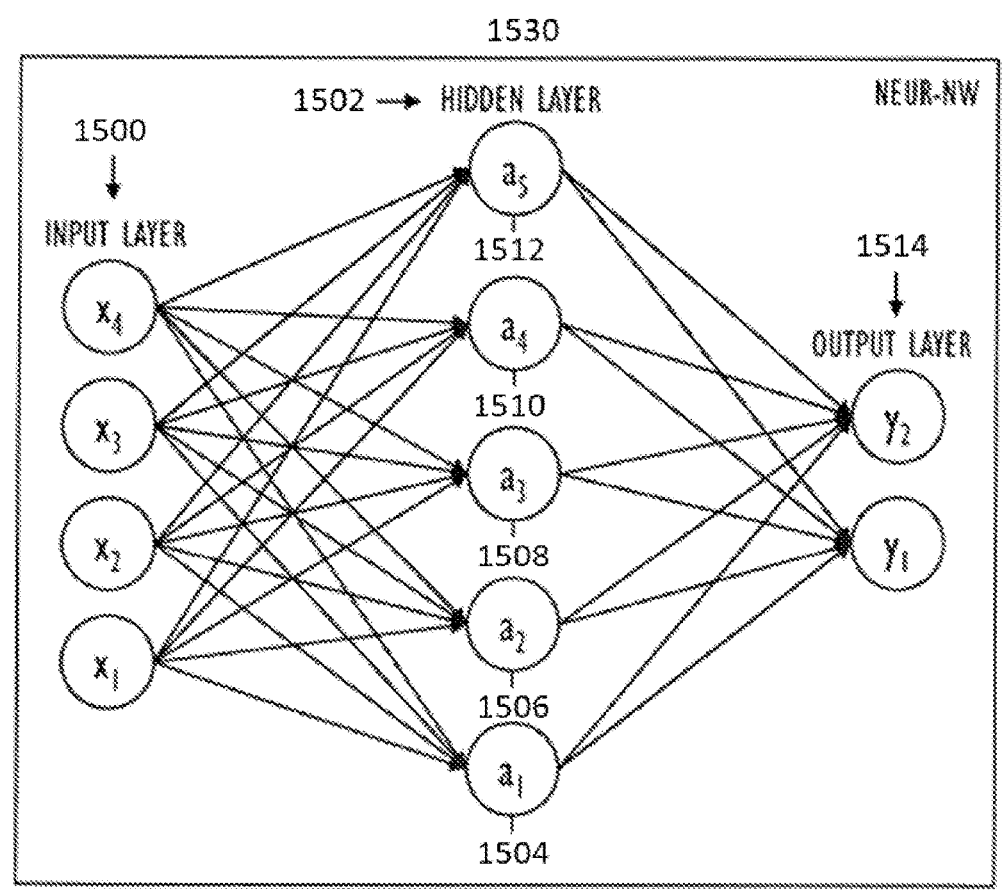
FIG. 15 illustrates an example of an artificial neural network.
Figure 16:
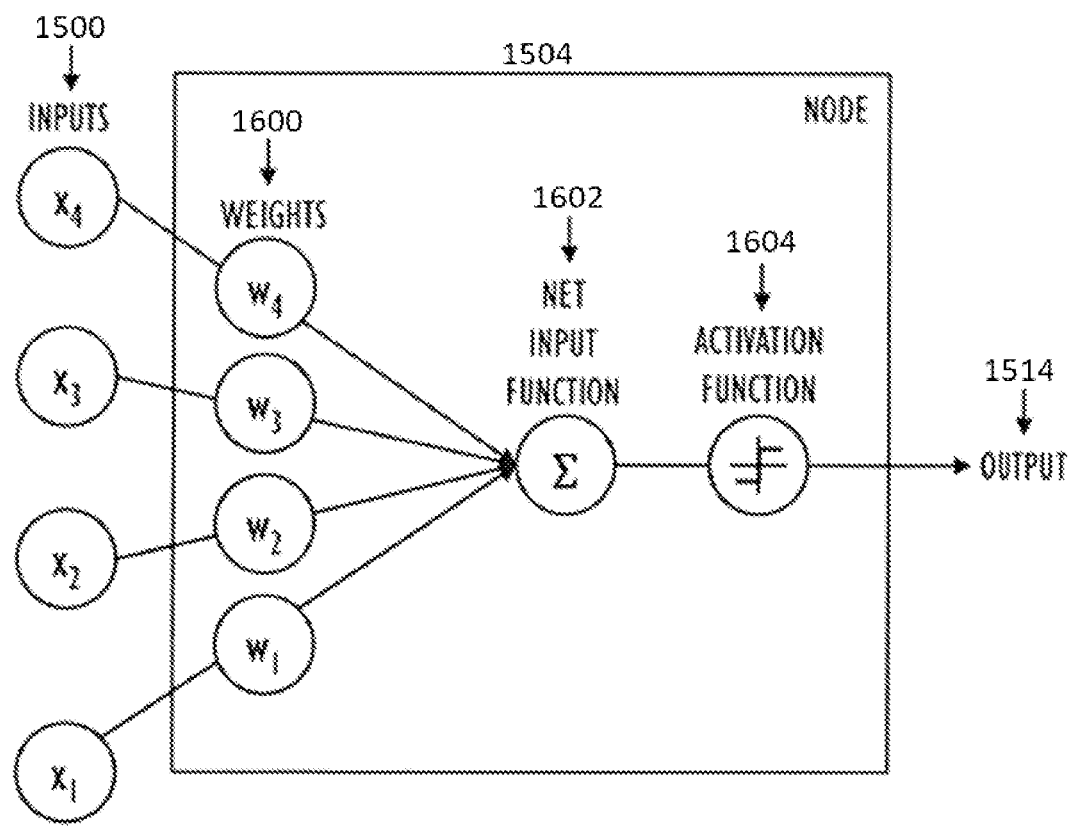
FIG. 16 illustrates an example of a computational node.

FIG. 15 illustrates an example of an artificial neural network 1530 with one hidden layer, and FIG. 16 illustrates an example of a computational node. The artificial neural network 1530 may correspond to the encoder 601 or the decoder 701, 702.

An artificial neural network (ANN) 1530 comprises a set of rules that are designed to execute tasks such as regression, classification, clustering, and pattern recognition. The ANNs achieve such objectives with a learning procedure, where they are shown various examples of input data, along with the desired output. With this, they learn to identify the proper output for any input within the training data manifold. Learning by using labels is called supervised learning and learning without labels is called unsupervised learning. Deep learning typically requires a large amount of input data.

Deep learning (also known as deep structured learning or hierarchical learning) is part of a broader family of machine learning methods based on the layers used in artificial neural networks. A deep neural network (DNN) 1530 is an artificial neural network comprising multiple hidden layers 1502 between the input layer 1500 and the output layer 1514. Training of DNN allows it to find the correct mathematical manipulation to transform the input into the proper output even when the relationship is highly non-linear and/or complicated.

Each hidden layer 1502 comprise nodes 1504, 1506, 1508, 1510, 1512, where the computation takes place. As shown in FIG. 16, each node 1504 combines input data 1500 with a set of coefficients, or weights 1600, that either amplify or dampen that input 1500, thereby assigning significance to inputs 1500 with regard to the task the algorithm is trying to learn. The input-weight products are added 1602 and the sum is passed through an activation function 1604, to determine whether and to what extent that signal should progress further through the network 1530 to affect the ultimate outcome, such as an act of classification. In the process, the neural networks learn to recognize correlations between certain relevant features and optimal results.

In the case of classification, the output of deep-learning network 1530 may be considered as a likelihood of a particular outcome, such as in this case a probability of decoding success of the sequence. In this case, the number of layers 1502 may vary proportional to the number of used input data 1500. However, when the number of input data 1500 is high, the accuracy of the outcome 1514 is more reliable. On the other hand, when there are fewer layers 1502, the computation might take less time and thereby reduce the latency. However, this highly depends on the specific DNN architecture and/or the computational resources.

Initial weights 1600 of the model can be set in various alternative ways. During the training phase they are adapted to improve the accuracy of the process based on analyzing errors in decision making. Training a model is basically a trial and error activity. In principle, each node 1504, 1506, 1508, 1510, 1512 of the neural network 1530 makes a decision (input*weight) and then compares this decision to collected data to find out the difference to the collected data. In other words, it determines the error, based on which the weights 1600 are adjusted. Thus, the training of the model may be considered a corrective feedback loop.

For example, a neural network model may be trained using a stochastic gradient descent optimization algorithm, for which the gradients are calculated using the backpropagation algorithm. The gradient descent algorithm seeks to change the weights 1600 so that the next evaluation reduces the error, meaning the optimization algorithm is navigating down the gradient (or slope) of error. It is also possible to use any other suitable optimization algorithm if it provides sufficiently accurate weights 1600. Consequently, the trained parameters of the neural network 1530 may comprise the weights 1600.

In the context of an optimization algorithm, the function used to evaluate a candidate solution (i.e., a set of weights) is referred to as the objective function. With neural networks, where the target is to minimize the error, the objective function may be referred to as a cost function or a loss function. In adjusting weights 1600, any suitable method may be used as a loss function, some examples are mean squared error (MSE), maximum likelihood (MLE), and cross entropy.

As for the activation function 1604 of the node 1504, it defines the output 1514 of that node 1504 given an input or set of inputs 1500. The node 1504 calculates a weighted sum of inputs, perhaps adds a bias and then makes a decision as "activate" or "not activate" based on a decision threshold as a binary activation or using an activation function 1604 that gives a nonlinear decision function. Any suitable activation function 1604 may be used, for example sigmoid, rectified linear unit (ReLU), normalized exponential function (softmax), sotfplus, tanh, etc. In deep learning, the activation function 1604 is usually set at the layer level and applies to all neurons in that layer. The output 1514 is then used as input for the next node and so on until a desired solution to the original problem is found.

The techniques and methods described herein may be implemented by various means. For example, these techniques may be implemented in hardware (one or more devices), firmware (one or more devices), software (one or more modules), or combinations thereof. For a hardware implementation, the apparatus(es) of example embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the example embodiments described above, but may vary within the scope of the claims. Therefore, all words and expressions should be interpreted broadly, and they are intended to illustrate, not to restrict, the example embodiments.

The invention claimed is:

1. An apparatus comprising at least one processor, and at least one memory storing instructions which, when executed by the at least one processor, cause the apparatus at least to:
   receive a sequence from a network element of a radio access network, wherein the sequence is encoded with a preamble matrix comprising a plurality of entries, wherein at least a subset of the plurality of entries indicate random-access preambles, and the preamble matrix has been generated randomly or based on a plurality of network entities or user equipment;
   decode the sequence, wherein the sequence is decoded by using a decoder that was trained by:
      creating a first matrix comprising a plurality of random-access preamble sets;
      selecting a sample batch from the first matrix;
      inputting the sample batch to an encoder with at least one neural network layer;
      receiving a sequence as an output from the encoder, wherein the sequence is encoded with the sample batch;
      inputting the sequence to the decoder with at least one neural network layer;
      receiving a second matrix as an output from the decoder;
      determining a binary cross-entropy loss comparing the sample batch and the second matrix;
      propagating the binary cross-entropy loss to the decoder and the encoder via an optimizer; and
      repeating the selection of the sample batch, the inputting of the sample batch, the receiving of the sequence, the inputting of the sequence, the receiving of the second matrix, the determining, and the propagating until the binary cross-entropy loss is below a threshold;
   generate a root sequence and a cyclic shift based at least partly on the decoding;
   generate a random-access preamble based on the root sequence and the cyclic shift; and transmit the random-access preamble to the network element.

2. The apparatus according to claim 1, wherein rows of the preamble matrix indicate cyclic shifts of the random-access preambles and columns of the preamble matrix indicate root sequences of the random-access preambles, or the rows indicate the root sequences and the columns indicate the cyclic shifts.

3. The apparatus according to claim 1, wherein the plurality of entries comprises at least two sets of values or symbols, and the subset comprises one set of values or symbols from the at least two sets of values or symbols.

4. The apparatus according to claim 1, wherein the decoding comprises mapping the sequence to the preamble matrix,
wherein the apparatus is further caused to:
select an entry from the at least subset of the plurality of entries comprised in the preamble matrix,
wherein the root sequence and the cyclic shift are generated based on a column and a row of the entry in the preamble matrix.

5. The apparatus according to claim 1, wherein the decoding comprises generating the root sequence and the cyclic shift from the sequence.

6. A method comprising:
receiving a sequence from a network element of a radio access network, wherein the sequence is encoded with a preamble matrix comprising a plurality of entries, wherein at least a subset of the plurality of entries indicate random-access preambles, and the preamble matrix has been generated randomly or based on a plurality of network entities or user equipment;
decoding the sequence, wherein the sequence is decoded by using a decoder that was trained by:
creating a first matrix comprising a plurality of random-access preamble sets;
selecting a sample batch from the first matrix;
inputting the sample batch to an encoder with at least one neural network layer;
receiving a sequence as an output from the encoder, wherein the sequence is encoded with the sample batch;
inputting the sequence to the decoder with at least one neural network layer;
receiving a second matrix as an output from the decoder;
determining a binary cross-entropy loss comparing the sample batch and the second matrix;
propagating the binary cross-entropy loss to the decoder and the encoder via an optimizer; and
repeating the selection of the sample batch, the inputting of the sample batch, the receiving of the sequence, the inputting of the sequence, the receiving of the second matrix, the determining, and the propagating until the binary cross-entropy loss is below a threshold;
generating a root sequence and a cyclic shift based at least partly on the decoding;
generating a random-access preamble based on the root sequence and the cyclic shift; and
transmitting the random-access preamble to the network element.

7. The method according to claim 6, wherein rows of the preamble matrix indicate cyclic shifts of the random-access preambles and columns of the preamble matrix indicate root sequences of the random-access preambles, or the rows indicate the root sequences and the columns indicate the cyclic shifts.

8. The method according to claim 6, wherein the plurality of entries comprises at least two sets of values or symbols, and the subset comprises one set of values or symbols from the at least two sets of values or symbols.

9. The method according to claim 6, wherein the decoding comprises mapping the sequence to the preamble matrix, wherein the method further comprises:
selecting an entry from the at least subset of the plurality of entries comprised in the preamble matrix,
wherein the root sequence and the cyclic shift are generated based on a column and a row of the entry in the preamble matrix.

10. The method according to claim 6, wherein the decoding comprises generating the root sequence and the cyclic shift from the sequence.

11. A non-transitory computer readable medium comprising program instructions which, when executed by an apparatus, cause the apparatus to perform at least the following:
receiving a sequence from a network element of a radio access network, wherein the sequence is encoded with a preamble matrix comprising a plurality of entries, wherein at least a subset of the plurality of entries indicate random-access preambles, wherein the preamble matrix has been generated randomly or based on a plurality of network entities or user equipment;
decoding the sequence, wherein the sequence is decoded by using a decoder that was trained by:
creating a first matrix comprising a plurality of random-access preamble sets;
selecting a sample batch from the first matrix;
inputting the sample batch to an encoder with at least one neural network layer;
receiving a sequence as an output from the encoder, wherein the sequence is encoded with the sample batch;
inputting the sequence to the decoder with at least one neural network layer;
receiving a second matrix as an output from the decoder;
determining a binary cross-entropy loss comparing the sample batch and the second matrix;
propagating the binary cross-entropy loss to the decoder and the encoder via an optimizer; and
repeating the selection of the sample batch, the inputting of the sample batch, the receiving of the sequence, the inputting of the sequence, the receiving of the second matrix, the determining, and the propagating until the binary cross-entropy loss is below a threshold;
generating a root sequence and a cyclic shift based at least partly on the decoding;
generating a random-access preamble based on the root sequence and the cyclic shift; and
transmitting the random-access preamble to the network element.

12. The non-transitory computer readable medium according to claim 11, wherein rows of the preamble matrix indicate cyclic shifts of the random-access preambles and columns of the preamble matrix indicate root sequences of the random-access preambles, or the rows indicate the root sequences and the columns indicate the cyclic shifts.

13. A system comprising at least one or more user devices and a network element of a radio access network;
  wherein the network element is configured to:
    generate a preamble matrix comprising a plurality of entries, wherein at least a subset of the plurality of entries indicate random-access preambles, and the preamble matrix is generated randomly or based on a plurality of network entities or user equipment;
    obtain a sequence encoded with the preamble matrix; and
    transmit the sequence to the one or more user devices;
  wherein the one or more user devices are configured to:
    receive the sequence from the network element;
    decode the sequence, wherein the sequence is decoded by using a decoder that was trained by:
      creating a first matrix comprising a plurality of random-access preamble sets;
      selecting a sample batch from the first matrix;
      inputting the sample batch to an encoder with at least one neural network layer;
      receiving a sequence as an output from the encoder, wherein the sequence is encoded with the sample batch;
      inputting the sequence to the decoder with at least one neural network layer;
      receiving a second matrix as an output from the decoder;
      determining a binary cross-entropy loss comparing the sample batch and the second matrix;
      propagating the binary cross-entropy loss to the decoder and the encoder via an optimizer; and
      repeating the selection of the sample batch, the inputting of the sample batch, the receiving of the sequence, the inputting of the sequence, the receiving of the second matrix, the determining, and the propagating until the binary cross-entropy loss is below a threshold;
    generate a root sequence and a cyclic shift based at least partly on the decoding;
    generate a random-access preamble based on the root sequence and the cyclic shift; and
    transmit the random-access preamble to the network element.

* * * * *